(12) United States Patent
Ma et al.

(10) Patent No.: US 12,538,382 B2
(45) Date of Patent: Jan. 27, 2026

(54) ELECTRONIC DEVICE FOR SWITCHING CELLULAR COMMUNICATION OR OPERATION MODE OF CELLULAR COMMUNICATION, BASED ON STATE OF ELECTRONIC DEVICE, AND OPERATION METHOD THEREFOR

(71) Applicant: Samsung Electronics Co., Ltd., Suwon-si (KR)

(72) Inventors: Dongchul Ma, Suwon-si (KR); Byungki Moon, Suwon-si (KR); Sungbo Park, Suwon-si (KR); Sanghyun Lee, Suwon-si (KR); Seungmoo Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 624 days.

(21) Appl. No.: 17/940,645

(22) Filed: Sep. 8, 2022

(65) Prior Publication Data

US 2023/0052406 A1 Feb. 16, 2023

Related U.S. Application Data

(63) Continuation of application No. PCT/KR2022/006791, filed on May 12, 2022.

(30) Foreign Application Priority Data

Aug. 12, 2021 (KR) ........................ 10-2021-0106861
Dec. 3, 2021 (KR) ........................ 10-2021-0171814
(Continued)

(51) Int. Cl.
*H04W 76/30* (2018.01)
*G01K 3/00* (2006.01)
(Continued)

(52) U.S. Cl.
CPC .......... *H04W 76/30* (2018.02); *H04B 17/318* (2015.01); *H04L 43/0888* (2013.01); *G01K 3/005* (2013.01)

(58) Field of Classification Search
CPC ........ G01K 3/005; H04B 17/318; H04B 7/08; H04L 43/0888; H04W 24/10;
(Continued)

(56) References Cited

U.S. PATENT DOCUMENTS

2013/0332720 A1 12/2013 Gupta et al.
2016/0021557 A1 1/2016 Tabet et al.
(Continued)

FOREIGN PATENT DOCUMENTS

JP 2011-229077 A1 11/2011
KR 10-2007-0025325 A 3/2007
(Continued)

OTHER PUBLICATIONS

Partial Supplementary European Search Report dated Oct. 16, 2024, issued in European Application No. 22855967.0-1215.
(Continued)

*Primary Examiner* — Awet Haile
(74) *Attorney, Agent, or Firm* — Jefferson IP Law, LLP

(57) ABSTRACT

An electronic device and a method of operating the same are provided. The electronic device includes a temperature sensor configured to measure a temperature of at least a part of the electronic device, a display, a communication circuit supporting first cellular communication and/or second cellular communication, an application processor, and a communication processor, wherein the application processor is configured to identify whether a deactivated state of the display is maintained for a designated time or longer while being connected via the first cellular communication, in response to the deactivated state maintained for the desig-
(Continued)

nated time or longer, identify whether each of the temperature measured by the temperature sensor and a throughput of data transmission via the first cellular communication satisfies a designated condition, and in response to the temperature and the throughput each satisfying the designated condition, control the communication processor to perform one or more operations for performing releasing of the first cellular communication.

9 Claims, 16 Drawing Sheets

(30) Foreign Application Priority Data

Dec. 15, 2021 (KR) .................. 10-2021-0180140
Feb. 4, 2022 (KR) .................. 10-2022-0015045

(51) Int. Cl.
*H04B 17/318* (2015.01)
*H04L 43/0888* (2022.01)

(58) Field of Classification Search
CPC ..... H04W 52/02; H04W 76/18; H04W 76/28; H04W 76/30; H04W 76/34; H04W 76/38; H04W 8/24; H04W 88/06; Y02D 30/70
See application file for complete search history.

(56) References Cited

U.S. PATENT DOCUMENTS

| | | |
|---|---|---|
| 2016/0062423 A1 | 3/2016 | Kim et al. |
| 2017/0099204 A1 | 4/2017 | Park et al. |
| 2017/0160785 A1 | 6/2017 | Mittal et al. |
| 2018/0181171 A1 | 6/2018 | Jang et al. |
| 2019/0064892 A1 | 2/2019 | Kim et al. |
| 2019/0098553 A1 | 3/2019 | Koshy et al. |
| 2020/0323032 A1 | 10/2020 | Kim et al. |
| 2020/0351771 A1 | 11/2020 | Geekie et al. |
| 2020/0356149 A1 | 11/2020 | Chae et al. |
| 2021/0026709 A1 | 1/2021 | Noh et al. |
| 2022/0022282 A1* | 1/2022 | Lee ................ H04W 24/10 |
| 2022/0197355 A1 | 6/2022 | Choi |
| 2023/0276518 A1* | 8/2023 | Zhi ................ H04W 76/30 370/329 |
| 2023/0276532 A1* | 8/2023 | Yang ............... H04W 52/0251 370/329 |
| 2024/0015604 A1* | 1/2024 | Zhang ............. H04W 36/00224 |
| 2024/0259905 A1* | 8/2024 | Sen ................ H04W 36/0083 |

FOREIGN PATENT DOCUMENTS

| | | |
|---|---|---|
| KR | 10-0823917 B1 | 4/2008 |
| KR | 10-2016-0145999 A | 12/2016 |
| KR | 10-2019-0021663 A | 3/2019 |
| KR | 10-2020-0117847 A | 10/2020 |
| KR | 10-2020-0129455 A | 11/2020 |
| KR | 10-2021-0011166 A | 2/2021 |
| KR | 10-2021-0030849 A | 3/2021 |

OTHER PUBLICATIONS

Extended European Search Report dated Jan. 9, 2025, issued in European Application No. 22855967.0-1215.

* cited by examiner

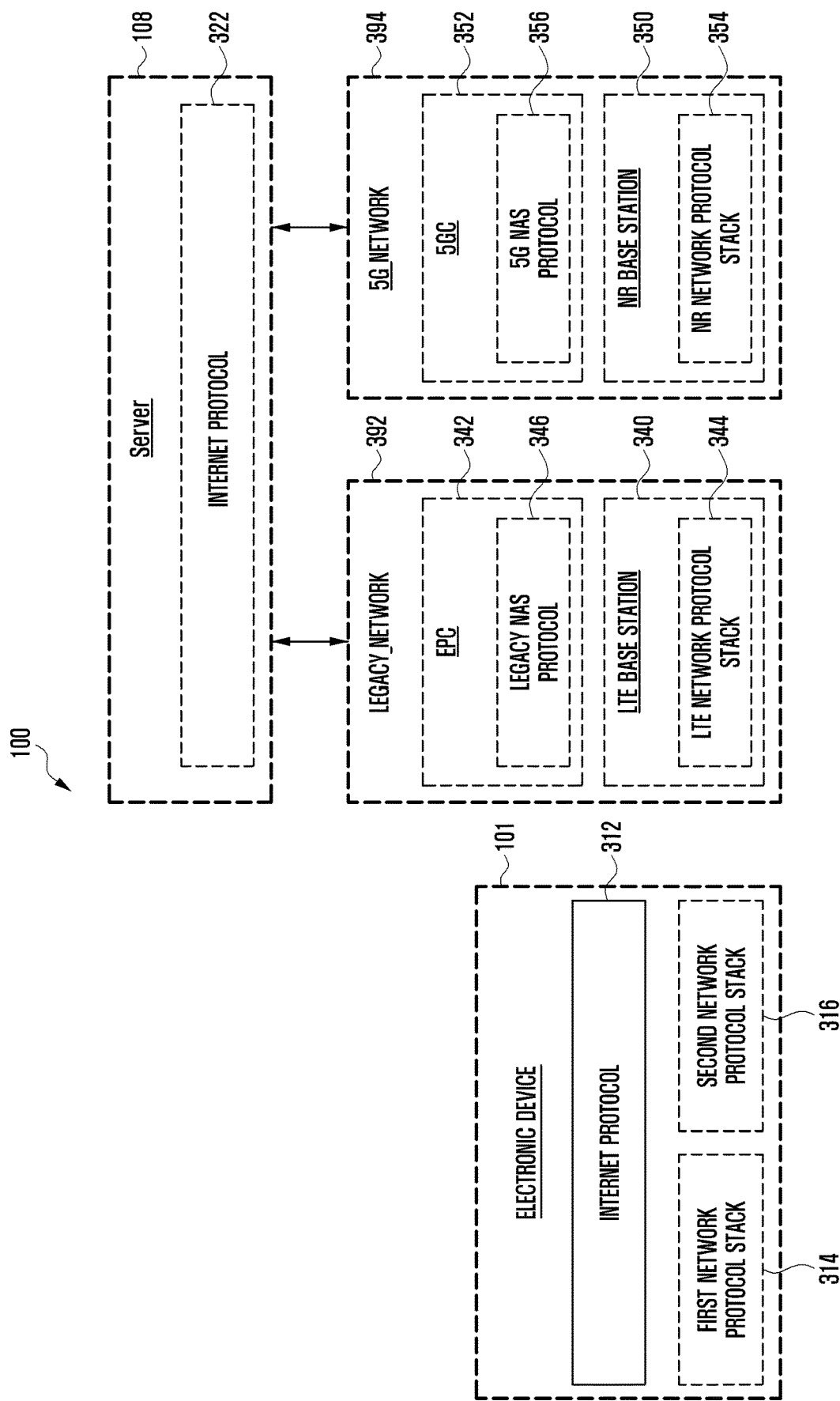

ELECTRONIC DEVICE FOR SWITCHING CELLULAR COMMUNICATION OR OPERATION MODE OF CELLULAR COMMUNICATION, BASED ON STATE OF ELECTRONIC DEVICE, AND OPERATION METHOD THEREFOR

CROSS-REFERENCE TO RELATED APPLICATION(S)

This application is a continuation application, claiming priority under § 365(c), of an International application No. PCT/KR2022/006791, filed on May 12, 2022, which is based on and claims the benefit of a Korean patent application number 10-2021-0106861, filed on Aug. 12, 2021, in the Korean Intellectual Property Office, of a Korean patent application number 10-2021-0171814, filed on Dec. 3, 2021, in the Korean Intellectual Property Office, of a Korean patent application number 10-2021-0180140, filed on Dec. 15, 2021, in the Korean Intellectual Property Office, and of a Korean patent application number 10-2022-0015045, filed on Feb. 4, 2022, in the Korean Intellectual Property Office, the disclosure of each of which is incorporated by reference herein in its entirety.

TECHNICAL FIELD

The disclosure relates to an electronic device and a method of operating the electronic device. More particularly, the disclosure relates to an electronic device for switching cellular communication connected based on a state of the electronic device or an operation of the cellular communication.

BACKGROUND ART

In order to meet the increase in the demand for wireless data traffic after the commercialization of $4^{th}$ generation (4G) communication systems, considerable effort has been made to develop pre-$5^{th}$ generation (5G) communication systems or improved 5G communication systems. For this reason, "5G communication systems" or "pre-5G communication systems" are called "beyond 4G network communication systems" or "beyond long term evolution (LTE) systems (post-LTE systems)". In order to achieve a high data transmission rate, 5G communication systems are being developed to be implemented in an ultra-high frequency (mmWave) band (for example, a band of 6 GHz or higher) in addition to a band (a band of 6 GHz or lower) used in LTE systems. In 5G communication systems, technologies, such as beamforming, massive multiple-input multiple-output (MIMO), full dimensional MIMO (FD-MIMO), array antennas, analog beam-forming, and large-scale antennas have been discussed.

The 5G mobile communication systems may support a non-standalone (NSA) in which data transmission or reception is performed from a base station in the 4G cellular communication and a base station of the 5G cellular communication, or a standalone (SA) in which data transmission or reception is performed from a base station of the 5G cellular communication.

The above information is presented as background information only to assist with an understanding of the disclosure. No determination has been made, and no assertion is made, as to whether any of the above might be applicable as prior art with regard to the disclosure.

DISCLOSURE OF INVENTION

Technical Problem

As a frequency band supported in the 5G cellular communication, a higher frequency band than the conventional communication scheme may be used. When an electronic device uses a frequency band communication scheme supported in the 5G cellular communication, power consumption may be greater than the convention communication scheme.

When the power consumption increase, a phenomenon in which the temperature of the electronic device increases may occur. when the temperature of the electronic device increases, power consumed by the electronic device further increases, which may lead to reduction in a time for which the electronic device is actually usable. Furthermore, when the temperature of the electronic device increase, various components provided at the electronic device may be damaged, and threshold voltages for operating the various components increase, which may cause the occurrence of a phenomenon requiring higher power consumption.

In order to prevent the above-described phenomenon, the electronic device may perform switching from the 5G cellular communication to the 4G cellular communication in which relatively less power is consumed. However, in the switching process, when data is received during a designated time of a timer configured in a network of the 5G cellular communication, releasing of a connection of the 5G cellular communication may be difficult. In this case, the electronic device cannot release the connection of the 5G cellular communication, whereby a phenomenon in which power consumption continuously increases may occur.

Aspects of the disclosure are to address at least the above-mentioned problems and/or disadvantages and to provide at least the advantages described below. Accordingly, an aspect of the disclosure is to provide an electronic device for switching cellular communication connected based on a state of the electronic device or an operation of the cellular communication.

Additional aspects will be set forth in part in the description which follows and, in part, will be apparent from the description, or may be learned by practice of the presented embodiments.

Solution to Problem

In accordance with an aspect of the disclosure, an electronic device is provided. The electronic device includes a temperature sensor configured to measure a temperature of at least a part of the electronic device, a display, a communication circuit supporting first cellular communication and/or second cellular communication, an application processor, and a communication processor, wherein the application processor is configured to identify a state of the display while being radio resource control (RRC)-connected via the first cellular communication, wherein, in response to the deactivated state of the display, the application processor is further configured to identify whether each of the temperature measured by the temperature sensor and a throughput of data transmission via the first cellular communication satisfies a designated condition, and wherein, in response to the temperature and the throughput each satisfying the designated condition, the application processor is further configured to control the communication processor to perform one or more operations for performing releasing of the first cellular communication.

In accordance with another aspect of the disclosure, a method of operating an electronic device is provided. The method includes identifying whether a deactivated state of a display is maintained for a designated time or longer in a state of a radio resource control (RRC) connection via first cellular communication, in response to the deactivated state maintained for the designated time or longer, identifying whether each of a temperature measured by a temperature sensor of the electronic device and a throughput of data transmission via the first cellular communication satisfies a designated condition, and in response to the temperature and the throughput each satisfying the designated condition, performing one or more operations for performing releasing of the RRC connection of a network connected via the first cellular communication.

In accordance with another aspect of the disclosure, an electronic device is provided. The electronic device includes a communication circuit supporting first cellular communication, an application processor, and a communication processor, wherein the application processor is configured to acquire information related a data throughput, and determine whether to transmit, to the communication processor, a signal requesting a change from a first mode to a second mode, based on whether a data throughput indicated by the information related to the data throughput satisfies a designated condition, the communication processor is configured to receive, from the application processor, the signal requesting the change from the first mode to the second mode, in response to the reception of the signal, measure a quality of the first cellular communication, and perform at least one operation for the change from the first mode to the second mode, based on the measured quality satisfying the designated condition, and each of the first mode and the second mode corresponds to a mode related to a number of antennas used for reception of data via the cellular communication.

Advantageous Effects of Invention

An electronic device and a method of operating the electronic device according to various embodiments of the disclosure may perform a series of operations for releasing of a connection of first cellular communication when a deactivated state of a display is maintained for a designated time or longer and the temperature and/or a throughput of the electronic device satisfies a designated condition. In addition, the electronic device may transmit an A2 measurement report and/or a secondary cell group failure (SCGF), instead of waiting for the releasing of the connection of the first cellular communication, so as to promptly perform the releasing of the first cellular communication. Accordingly, the electronic device can reduce time required for the releasing of the connection of the first cellular communication, and reduce power consumption and heating.

An electronic device and a method of operating the electronic device according to various embodiments of the disclosure may perform a series of operations for switching from a first mode to a second mode, in which a smaller number of antennas than those used in the first mode are used, when a data throughput satisfies a designated condition. Accordingly, the electronic device can reduce power consumption and heating which may be caused by the use of antennas.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which:

FIG. 3 illustrates a protocol stack structure of a network in legacy communication and/or 5G communication according to an embodiment of the disclosure;

The same reference numerals are used to represent the same elements throughout the drawings.

MODE FOR THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
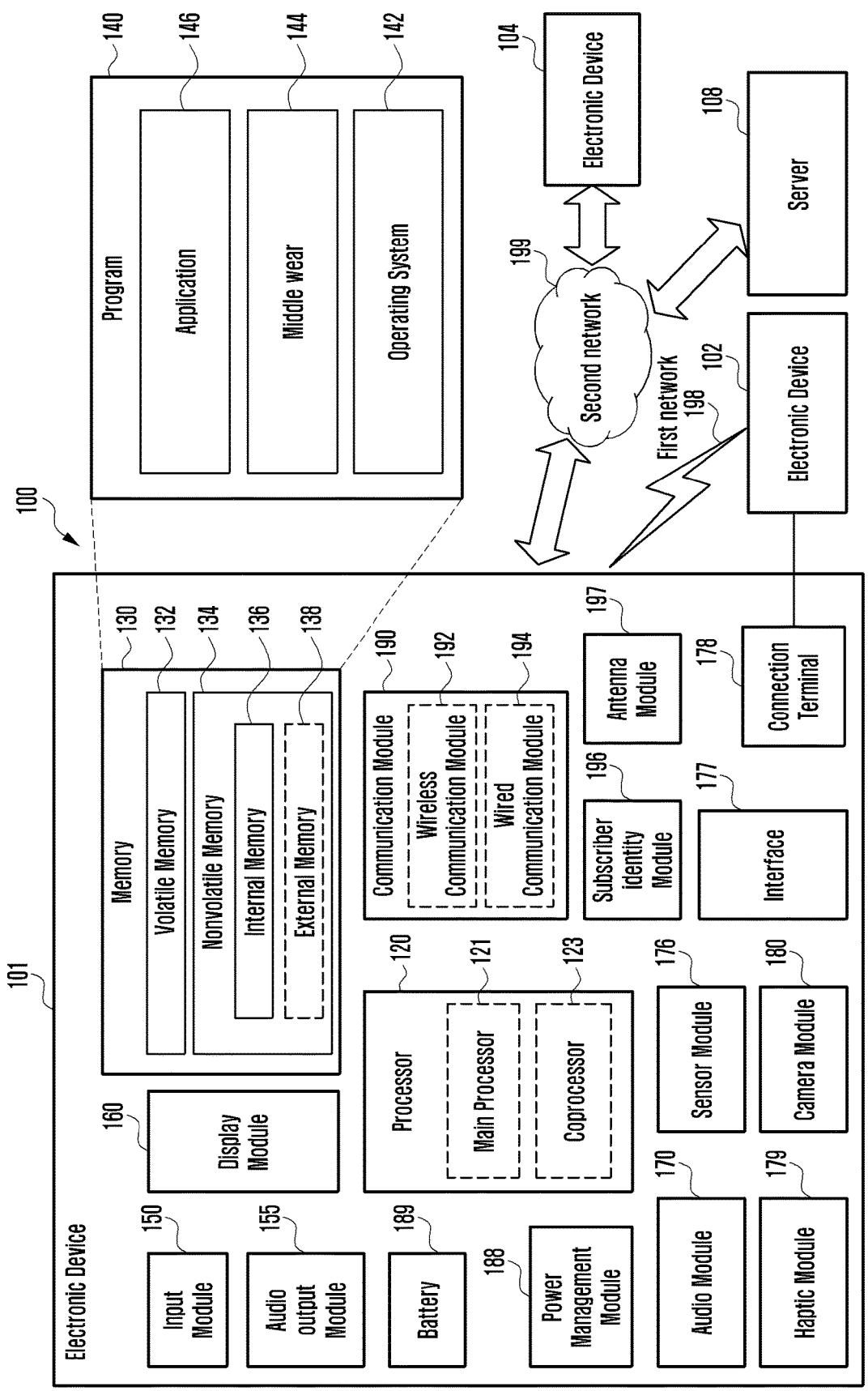
FIG. 1 is a block diagram illustrating an electronic device according to an embodiment of the disclosure.

FIG. 1 is a block diagram illustrating an electronic device in a network environment according to an embodiment of the disclosure. Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment of the disclosure, the electronic device 101 may communicate with the electronic device 104 via the server 108. According to an embodiment of the disclosure, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments of the disclosure, at least one (e.g., the display device 160 or the camera module 180) of the components may be omitted from the electronic device 101, or one or more other components may be added in the electronic device 101. In some embodiments of the disclosure, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment of the disclosure, as at least part of the data processing or computation, the processor 120 may load a command or data received from another component (e.g., the sensor module 176 or the communication module 190) in a volatile memory 132, process the command or the data stored in the volatile memory 132, and store resulting data in a non-volatile memory 134. According to an embodiment of the disclosure, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment of the disclosure, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment of the disclosure, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment of the disclosure, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment of the disclosure, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to an embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment of the disclosure, the antenna module 197 may include an antenna including a radiating element implemented using a conductive material or a conductive pattern formed in or on a substrate (e.g., a printed circuit board (PCB)). According to an embodiment of the disclosure, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

The antenna module 197 may transmit or receive a signal or power to or from the outside (e.g., the external electronic device) of the electronic device 101. According to an embodiment of the disclosure, the antenna module 197 may include an antenna including a radiating element implemented using a conductive material or a conductive pattern formed in or on a substrate (e.g., a printed circuit board (PCB)). According to an embodiment of the disclosure, the antenna module 197 may include a plurality of antennas. In such a case, at least one antenna appropriate for a communication scheme used in the communication network, such as the first network 198 or the second network 199, may be selected, for example, by the communication module 190

(e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment of the disclosure, all or some of operations to be executed at the electronic device 101 may be executed at one or more of the external electronic devices 102 or 104. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
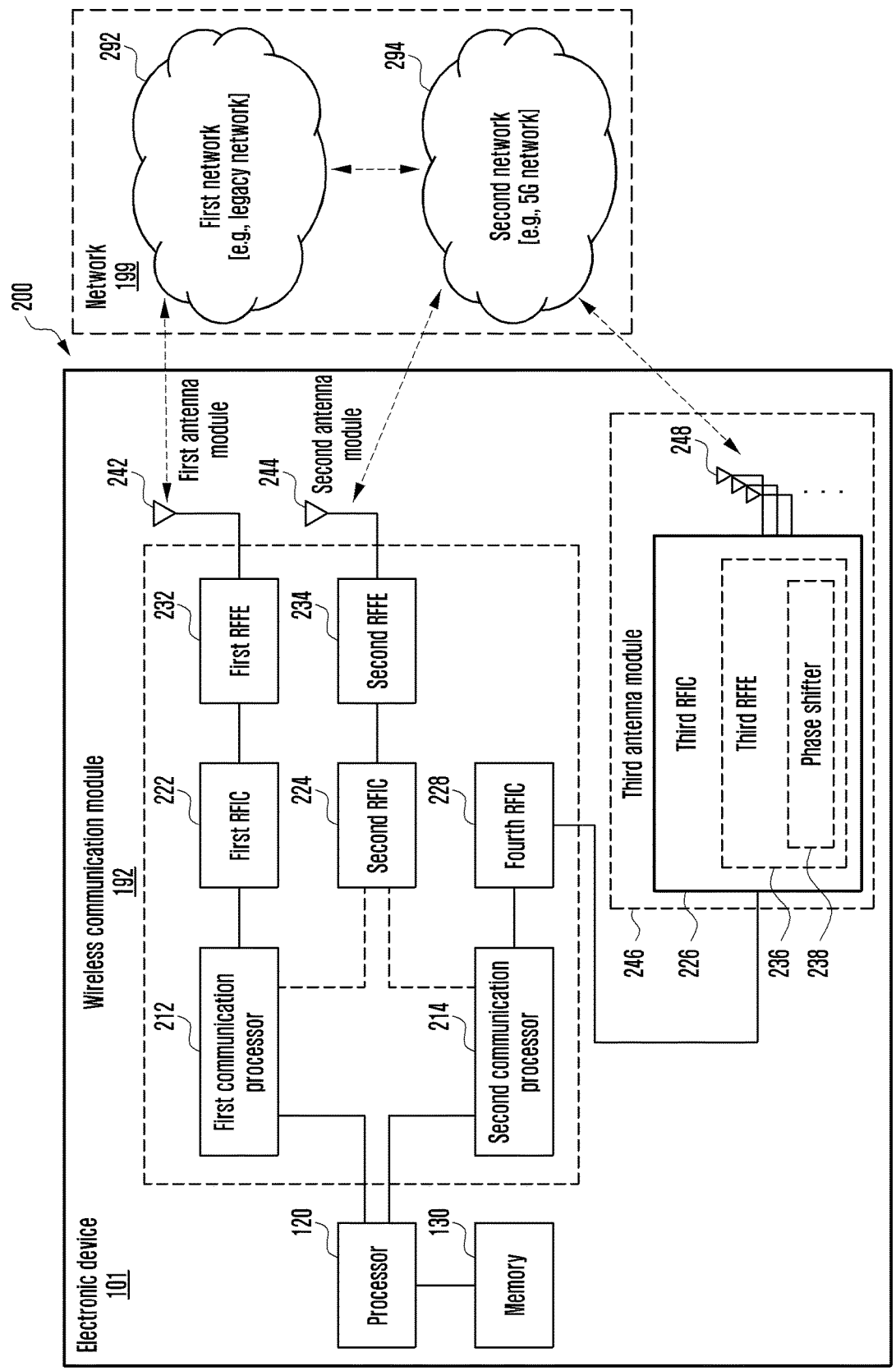
FIG. 2 is a block diagram illustrating an electronic device for supporting legacy network communication and 5G network communication according to an embodiment of the disclosure.

FIG. 2 is a block diagram 200 of an electronic device 101 for supporting legacy network communication and 5G network communication according to an embodiment of the disclosure. Referring to FIG. 2, the electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include the processor 120 and the memory 130. The network 199 may include a first network 292 and a second network 294. According to another embodiment of the disclosure, the electronic device 101 may further include at least one component among the components illustrated in FIG. 1, and the network 199 may further include at least one other network. According to an embodiment of the disclosure, the first communication processor 212, the second communication processor 214, the first RFIC 222, the second RFIC 224, the fourth RFIC 228, the first RFFE 232, and the second RFFE 234 may be included as at least a part of the wireless communication module 192. According to another embodiment of the disclosure, the fourth RFIC 228 may be omitted or may be included as a part of the third RFIC 226.

The first communication processor 212 may establish a communication channel of a band to be used for wireless communication with the first network 292, and may support legacy network communication via the established communication channel According to certain embodiments of the disclosure, the first network may be a legacy network including second-generation (2G), third-generation (3G), 4G, or long term evolution (LTE) network. The second communication processor 214 may establish a communication channel corresponding to a designated band (e.g., approximately 6 GHz to 60 GHz) among bands to be used for wireless communication with the second network 294, and may support 5G network communication via the established channel According to certain embodiments of the disclosure, the second network 294 may be a 5G network defined in third generation partnership project (3GPP). Additionally, according to an embodiment of the disclosure, the first communication processor 212 or the second communication processor 214 may establish a communication channel corresponding to another designated band (e.g., lower than 6 GHz) among bands to be used for wireless communication with the second network 294, and may support 5G network communication via the established channel According to an embodiment of the disclosure, the first communication processor 212 and the second communication processor 214 may be implemented in a single chip or a single package. According to certain embodiments of the disclosure, the first communication processor 212 or the second communication processor 214 may be implemented in a single chip or a single package, together with the processor 120, the auxiliary processor 123, or the communication module 190.

In the case of transmission, the first RFIC 222 may convert a baseband signal generated by the first communication processor 212 into a radio frequency (RF) signal in a range of approximately 700 MHz to 3 GHz used for the first network 292 (e.g., a legacy network). In the case of reception, an RF signal is obtained from the first network 292 (e.g., a legacy network) via an antenna (e.g., the first antenna module 242), and may be preprocessed via an RFFE (e.g., the first RFFE 232). The first RFIC 222 may convert the preprocessed RF signal to a baseband signal so that the base band signal is processed by the first communication processor 212.

In the case of transmission, the second RFIC 224 may convert a baseband signal generated by the first communication processor 212 or the second communication processor 214 into an RF signal (hereinafter, a 5G Sub6 RF signal) of a Sub6 band (e.g., lower than 6 GHz) used for the second network 294 (e.g., 5G network). In the case of reception, a 5G Sub6 RF signal is obtained from the second network 294 (e.g., a 5G network) via an antenna (e.g., the second antenna module 244), and may preprocessed by an RFFE (e.g., the second RFFE 234). The second RFIC 224 may convert the preprocessed 5G Sub6 RF signal into a baseband signal so that the baseband signal is processed by a corresponding communication processor from among the first communication processor 212 or the second communication processor 214.

The third RFIC 226 may convert a baseband signal generated by the second communication processor 214 into an RF signal (hereinafter, a 5G Above6 RF signal) of a 5G Above6 band (e.g., approximately 6 GHz to 60 GHz) to be used for the second network 294 (e.g., 5G network). In the case of reception, a 5G Above6 RF signal is obtained from the second network 294 (e.g., a 5G network) via an antenna (e.g., the antenna 248), and may be preprocessed by the third RFFE 236. The third RFIC 226 may convert the preprocessed 5G Above6 RF signal to a baseband signal so that the base band signal is processed by the second communication processor 214. According to an embodiment of the disclosure, the third RFFE 236 may be implemented as a part of the third RFIC 226.

According to an embodiment of the disclosure, the electronic device 101 may include the fourth RFIC 228, separately from or as a part of the third RFIC 226. In this instance, the fourth RFIC 228 may convert a baseband signal generated by the second communication processor 214 into an RF signal (hereinafter, an IF signal) in an intermediate frequency band (e.g., approximately 9 GHz to 11 GHz), and may transfer the IF signal to the third RFIC 226. The third RFIC 226 may convert the IF signal to a 5G Above6 RF signal. In the case of reception, a 5G Above6 RF signal is received from the second network 294 (e.g., a 5G network) via an antenna (e.g., the antenna 248), and may be converted into an IF signal by the third RFFE 226. The fourth RFIC 228 may convert the IF signal to a baseband signal so that the base band signal is processed by the second communication processor 214.

According to an embodiment of the disclosure, the first RFIC 222 and the second RFIC 224 may be implemented as a single chip or at least a part of the single package. According to an embodiment of the disclosure, the first RFFE 232 and the second RFFE 234 may be implemented as a single chip or at least a part of the single package. According to an embodiment of the disclosure, at least one antenna module of the first antenna module 242 or the second antenna module 244 may be omitted, or may be combined with another antenna module so as to process RF signals in a plurality of bands.

According to an embodiment of the disclosure, the third RFIC 226 and the antenna 248 may be disposed in the same substrate, and may form a third antenna module 246. For example, the wireless communication module 192 or the processor 120 may be disposed in a first substrate (e.g., a main PCB). In this instance, the third RFIC 226 is disposed in a part (e.g., a lower part) of the second substrate (e.g., a sub PCB) separate from the first substrate and the antenna 248 is disposed on another part (e.g., an upper part), so that the third antenna module 246 is formed. By disposing the third RFIC 226 and the antenna 248 in the same substrate, the length of a transmission line therebetween may be reduced. For example, this may reduce a loss (e.g., attenuation) of a signal in a high-frequency band (e.g., approximate 6 GHz to 60 GHz) used for 5G network communication, the loss being caused by a transmission line. Accordingly, the electronic device 101 may improve the quality or speed of communication with the second network 294 (e.g., 5G network).

According to an embodiment of the disclosure, the antenna 248 may be implemented as an antenna array including a plurality of antenna elements which may be used for beamforming. In this instance, the third RFIC 226 may be, for example, a part of the third RFFE 236, and may include a plurality of phase shifters 238 corresponding to a plurality of antenna elements. In the case of transmission, each of the plurality of phase shifters 238 may shift the phase of a 5G Above6RF signal to be transmitted to the outside of the electronic device 101 (e.g., a base station of a 5G network) via a corresponding antenna element. In the case of reception, each of the plurality of phase shifters 238 may shift the phase of the 5G Above6 RF signal received from the outside via a corresponding antenna element into the same or substantially the same phase. This may enable transmission or reception via beamforming between the electronic device 101 and the outside.

The second network 294 (e.g., 5G network) may operate independently (e.g., stand-along (SA)) from the first network 292 (e.g., a legacy network), or may operate by being connected thereto (e.g., non-stand alone (NSA)). For example, in the 5G network, only an access network (e.g., 5G radio access network (RAN) or next generation RAN (NG RAN)) may exist, and a core network (e.g., next generation core (NGC)) may not exist. In this instance, the electronic device 101 may access an access network of the 5G network, and may access an external network (e.g., the Internet) under the control of the core network (e.g., an evolved packed core (EPC)) of the legacy network. Protocol information (e.g., LTE protocol information) for communication with the legacy network or protocol information (e.g., new radio (NR) protocol information) for communication with the 5G network may be stored in the memory 230, and may be accessed by another component (e.g., the processor 120, the first communication processor 212, or the second communication processor 214).

FIG. 3 illustrates a protocol stack structure of the network 100 of legacy communication and/or 5G communication according to an embodiment of the disclosure.

Referring to FIG. 3, the network 100 according to an illustrated embodiment may include the electronic device 101, a legacy network 392, a 5G network 394, and the server 108.

The electronic device 101 may include an Internet protocol 312, a first communication protocol stack 314, and a second communication protocol stack 316. The electronic device 101 may communicate with the server 108 through the legacy network 392 and/or the 5G network 394.

According to an embodiment of the disclosure, the electronic device 101 may perform Internet communication associated with the server 108 through the Internet protocol 312 (for example, a transmission control protocol (TCP), a user datagram protocol (UDP), or an internet protocol (IP)). The Internet protocol 312 may be executed by, for example, a main processor (for example, the main processor 121 of FIG. 1) included in the electronic device 101.

According to another embodiment of the disclosure, the electronic device 101 may perform wireless communication with the legacy network 392 through the first communication protocol stack 314. According to another embodiment of the disclosure, the electronic device 101 may perform wireless communication with the 5G network 394 through the second communication protocol stack 316. The first communication protocol stack 314 and the second communication protocol stack 316 may be executed by, for example, one or more communication processors (for example, the wireless communication module 192 of FIG. 1) included in the electronic device 101.

The server 108 may include an Internet protocol 322. The server 108 may transmit and receive data related to the Internet protocol 322 to and from the electronic device 101 through the legacy network 392 and/or the 5G network 394. According to an embodiment of the disclosure, the server 108 may include a cloud computing server existing outside the legacy network 392 or the 5G network 394. According to another embodiment of the disclosure, the server 108 may include an edge computing server (or a mobile edge computing (MEC) server) located inside at least one of the legacy network or the 5G network 394.

The legacy network 392 may include an LTE eNode B (eNB) 340 and an EPC 342. The LTE eNB 340 may include an LTE communication protocol stack 344. The EPC 342 may include a legacy NAS protocol 346. The legacy network 392 may perform LTE wireless communication with the electronic device 101 through the LTE communication protocol stack 344 and the legacy NAS protocol 346.

The 5G network 394 may include an NR gNB 350 and a 5GC 352. The NR gNB 350 may include an NR communication protocol stack 354. The 5GC 352 may include a 5G NAS protocol 356. The 5G network 394 may perform NR wireless communication with the electronic device 101 through the NR communication protocol stack 354 and the 5G NAS protocol 356.

According to an embodiment of the disclosure, the first communication protocol stack 314, the second communication protocol stack 316, the LTE communication protocol stack 344, and the NR communication protocol stack 354 may include a control plane protocol for transmitting and receiving a control message and a user plane protocol for transmitting and receiving user data. The control message may include a message related to at least one of, for example, security control, bearer setup, authentication, registration, or mobility management. The user data may include, for example, the remaining data except other than the control message.

According to an embodiment of the disclosure, the control plane protocol and the user plane protocol may include a physical (PHY) layer, a medium access control (MAC) layer, a radio link control (RLC) layer, or a packet data convergence protocol (PDCP) layer. The PHY layer may channel-code and modulate data received from, for example, a higher layer (for example, the MAC layer), transmit the data through a radio channel, demodulate and decode the data received through the radio channel, and transmit the data to the higher layer. The PHY layer included in the second communication protocol stack 316 and the NR communication protocol stack 354 may further perform an operation related to beamforming. The MAC layer may logically/physically map, for example, data to a radio channel for transmitting and receiving the data and perform a hybrid automatic repeat request (HARQ) for error correction. The RLC layer may perform, for example, data concatenation, segmentation, or reassembly, and data sequence identification, reordering, or duplication detection. The PDCP layer may perform an operation related to, for example, ciphering of a control message and user data and data integrity. The second communication protocol stack 316 and the NR communication protocol stack 354 may further include a service data adaptation protocol (SDAP). The SDAP may manage allocation of radio bearers based on quality of service (QoS) of user data.

According to certain embodiments of the disclosure, the control plane protocol may include a radio resource control (RRC) layer and a non-access stratum (NAS) layer. The RRC layer may process control, for example, data related to radio bearer setup, paging, or mobility management. The NAS may process, for example, a control message related to authentication, registration, or mobility management.

Figure 4A:
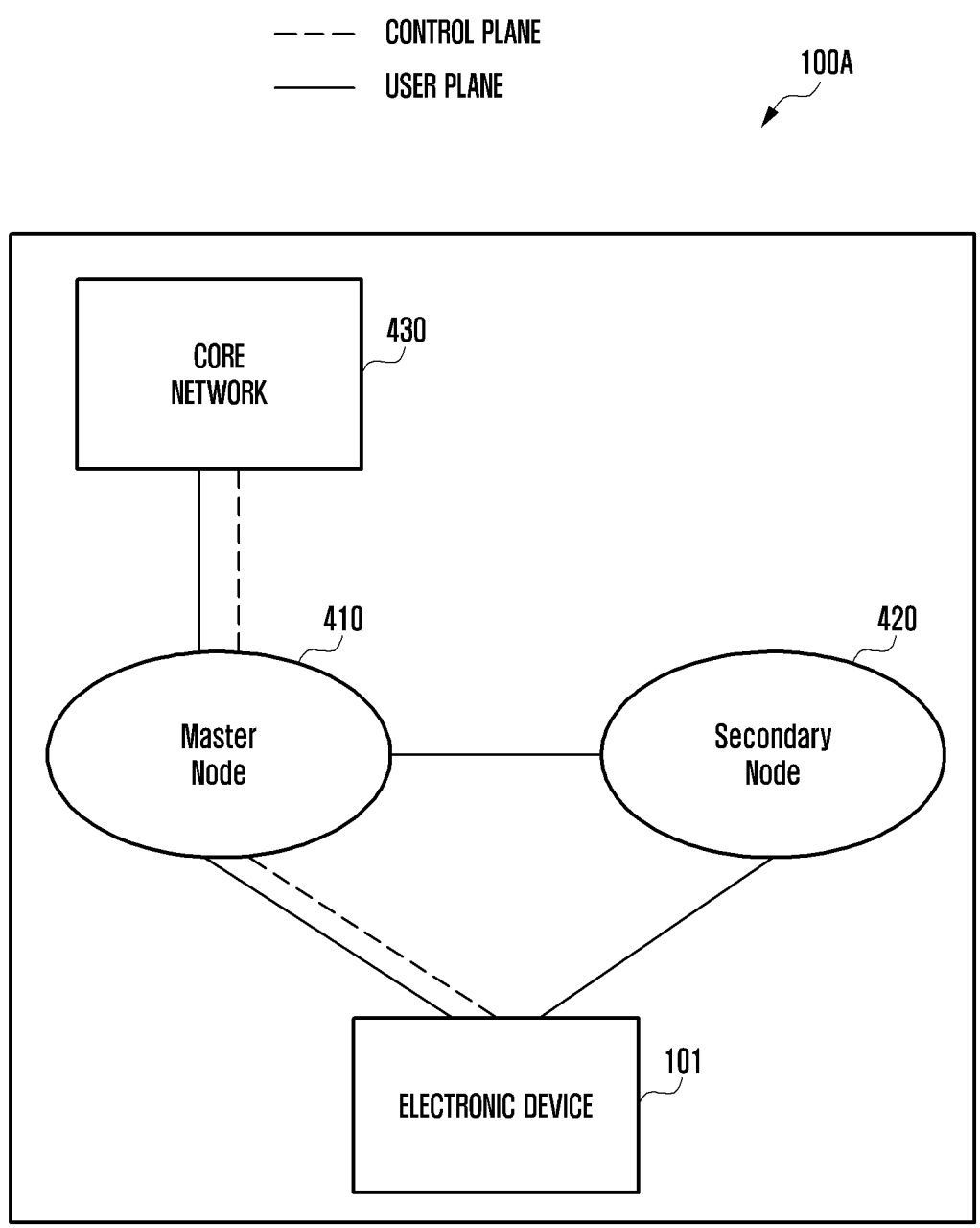
FIGS. 4A, 4B, and 4C illustrate radio communication systems providing a network in legacy communication and/or 5G communication according to various embodiments of the disclosure.
Figure 4B:
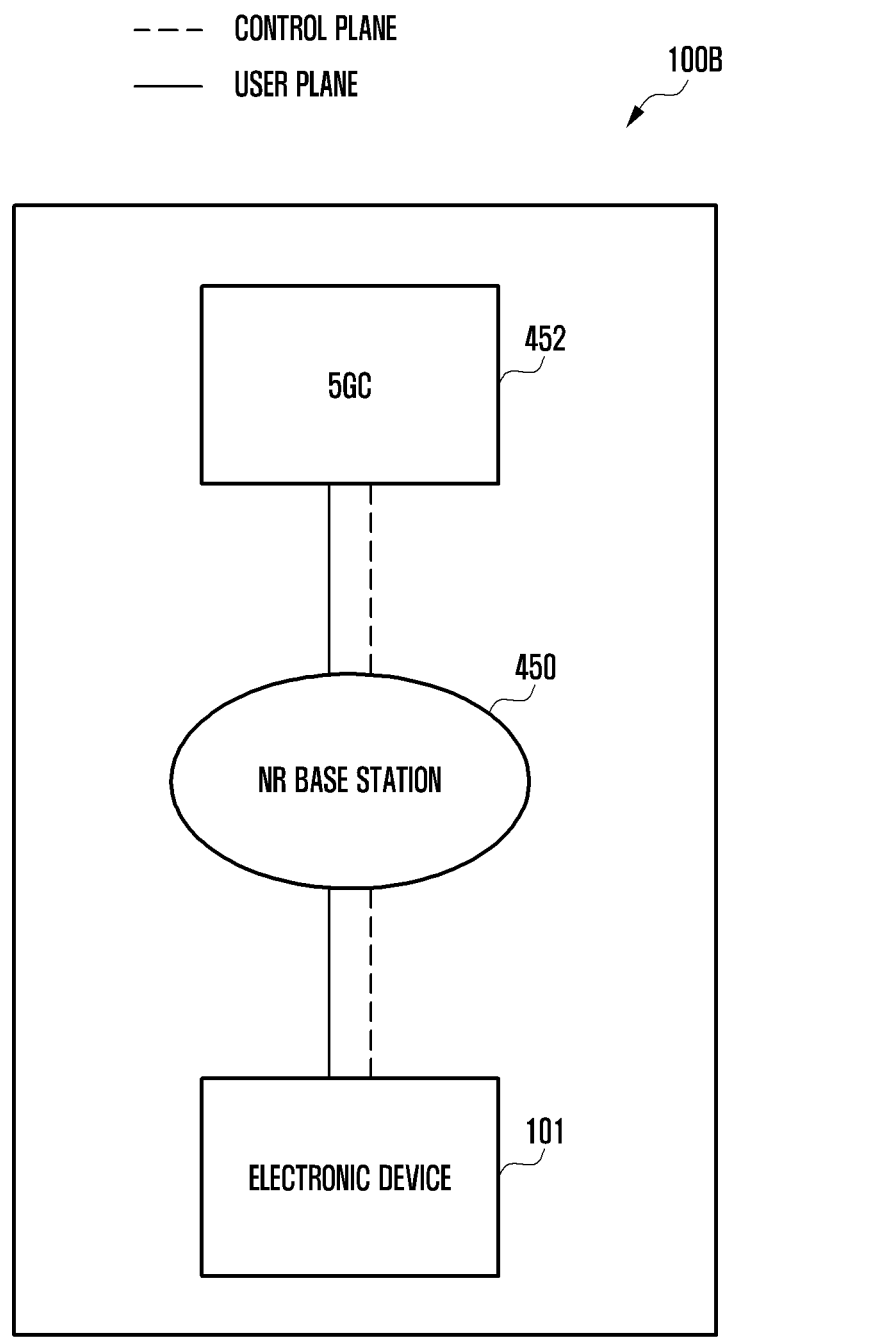
Figure 4C:
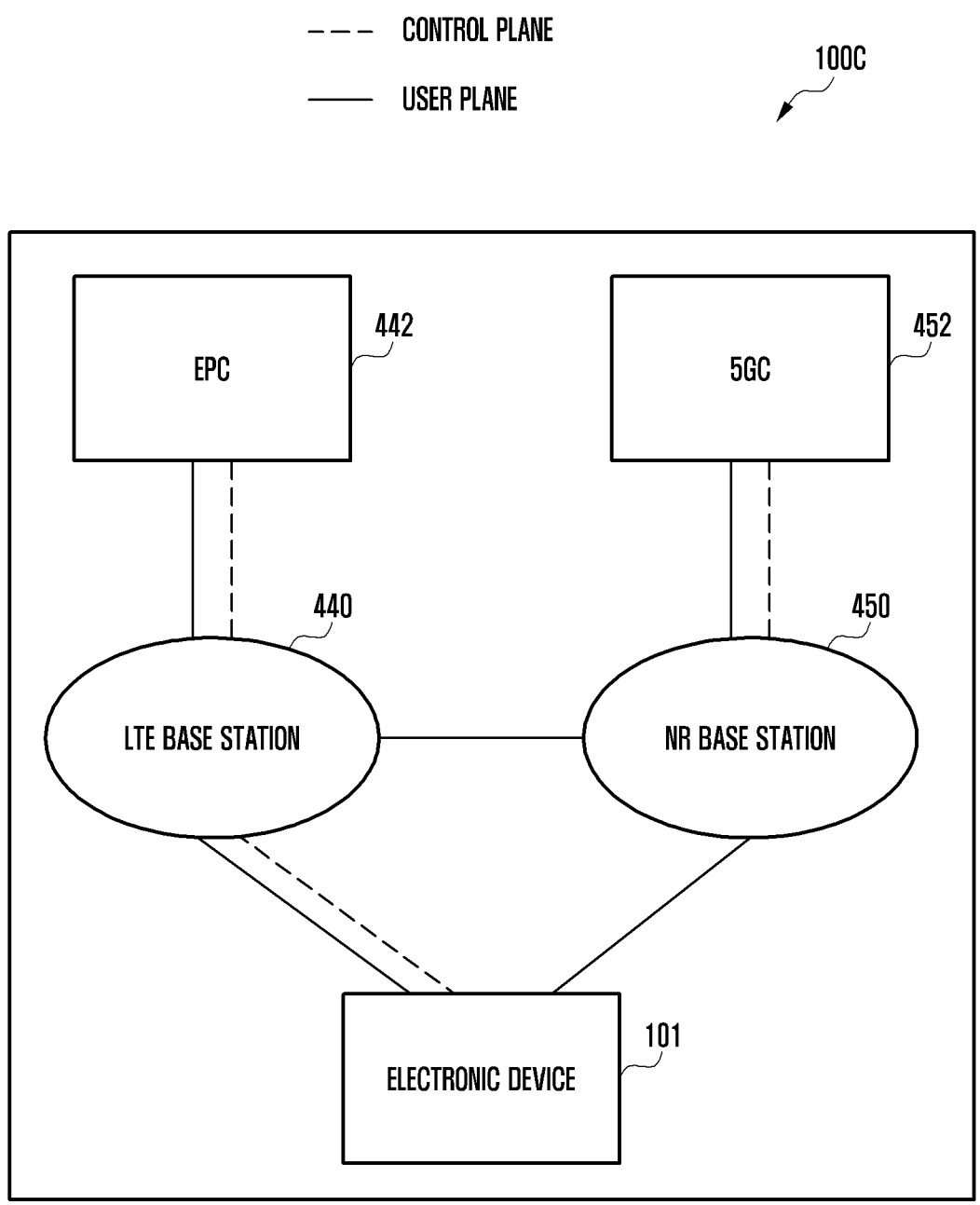

FIG. 4A illustrates a wireless communication system providing a network of legacy communication and/or 5G communication according to an embodiment of the disclosure. Referring to FIGS. 4A, 4B, and 4C, network environments 100A, 100B and 100C may include at least one of a legacy network and a 5G network. The legacy network may include, for example, a 4G or LTE eNB 450 (for example, an eNodeB (eNB)) of the 3GPP standard supporting radio access with the electronic device 101 and an evolved packet core (EPC) 451 for managing 4G communication. The 5G network may include, for example, a new radio (NR) gNB 450 (for example, a gNodeB (gNB)) supporting radio access with the electronic device 101 and a $5^{th}$ generation core (5GC) 452 for managing 5G communication of the electronic device 101.

According to certain embodiments of the disclosure, the electronic device 101 may transmit and receive a control message and user data through legacy communication and/or 5G communication. The control message may include, for example, a control message related to at least one of security control of the electronic device 101, bearer setup, authentication, registration, or mobility management. The user data may be, for example, user data other than a control message transmitted and received between the electronic device 101 and a core network 430 (for example, the EPC 442).

Referring to FIG. 4A, the electronic device 101 according to an embodiment may transmit and receive at least one of a control message or user data to and from at least some of the 5G network (for example, the NR gNB 450 and the 5GC 452) using at least some of the legacy network (for example, the LTE eNB 440 and the EPC 442).

According to certain embodiments of the disclosure, the network environment 100A may include a network environment for providing wireless communication dual connectivity (multi-radio access technology (RAT) dual connectivity (MR-DC)) to the LTE eNB 440 and the NR gNB 450 and transmitting and receiving a control message to and from the electronic device 101 through one core network 430 of the EPC 442 or the 5GC 452.

According to certain embodiments of the disclosure, one of the MR-DC environment, the LTE eNB 440 or the NR gNB 450 may operate as a master node (MN) 410, and the other may operate as a secondary node (SN) 420. The MN 410 may be connected to the core network 430 and transmit and receive a control message. The MN 410 and the SN 420 may be connected to each other through a network interface and transmit and receive a message related to radio resource (for example, communication channel) management.

According to certain embodiments of the disclosure, the MN 410 may include the LTE eNB 450, the SN 420 may include the NR gNB 450, and the core network 430 may include the EPC 442. For example, a control message may be transmitted and received through the LTE eNB 440 and the EPC 442, and user data may be transmitted and received through the LTE eNB 450 and the NR gNB 450.

Referring to FIG. 4B, according to certain embodiments of the disclosure, the 5G network may independently transmit and receive a control message and user data to and from the electronic device 101.

Referring to FIG. 4C, the legacy network and the 5G network according to certain embodiments may independently provide data transmission and reception. For example, the electronic device 101 and the EPC 442 may transmit and receive a control message and user data through the LTE eNB 450. According to another embodiment of the disclosure, the electronic device 101 and the 5GC 452 may transmit and receive a control message and user data through the NR gNB 450.

According to certain embodiments of the disclosure, the electronic device 101 may be registered in at least one of the EPC 442 or the 5GC 450 and transmit and receive a control message.

According to certain embodiments of the disclosure, the EPC 442 or the 5GC 452 may interwork and manage communication of the electronic device 101. For example, movement information of the electronic device 101 may be transmitted and received through an interface between the EPC 442 and the 5GC 452.

Figure 5A:
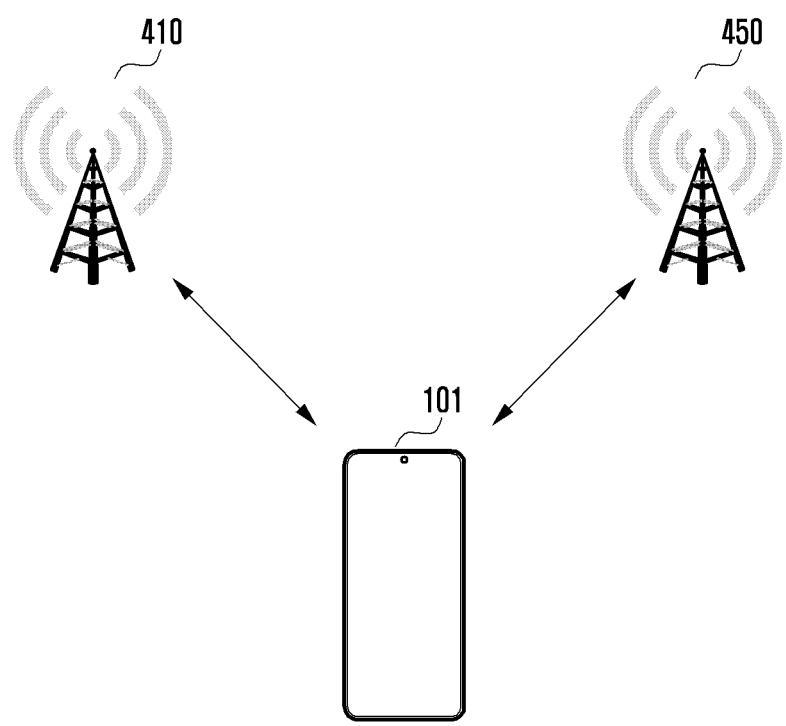
FIG. 5A illustrates an electronic device and a cellular network according to an embodiment of the disclosure.

FIG. 5A illustrates an electronic device and a cellular network according to an embodiment of the disclosure.

According to various embodiments of the disclosure, a cellular network 500 may include a first node (e.g., the NR base station 450 of FIG. 4B) and/or a second node (e.g., the master node 410 of FIG. 4A).

According to various embodiments of the disclosure, the first node 450 may be a base station supporting first cellular communication. The first cellular communication corresponds to one of various cellular communication schemes which can be supported by the electronic device 101, and may mean, for example, a communication scheme on the second network 294 of FIG. 2. For example, the first cellular communication may be a communication scheme using a 5G mobile communication scheme (e.g., a new radio). According to an embodiment of the disclosure, the first node 450 may be a base station supporting a standalone mode supported in the first cellular communication. The standalone mode may correspond to a mode in which the electronic device 101 transmits or receive data by using a base station supporting the first cellular communication. The electronic device 101 may be connected to the first node 450 to transmit or receive data.

According to various embodiments of the disclosure, the second node 410 may be a base station supporting second cellular communication. The second cellular communication corresponds to one of various cellular communication schemes which can be supported by an electronic device (e.g., the electronic device 101 of FIG. 1), and may mean, for example, a communication scheme on the first network 292 of FIG. 2. For example, the second cellular communication may be a communication scheme using the 4G mobile communication scheme (e.g., long-term evolution).

According to various embodiments of the disclosure, the first cellular communication may correspond to cellular communication performing data communication using a relatively higher frequency band than the second cellular communication. The frequency band of the first cellular communication may be higher than that of the second cellular communication. The first node 450 supporting the first cellular communication may have a relatively shorter coverage than to the second node 410 supporting the second cellular communication, due to the characteristic of a high frequency band. In addition, the strength of a signal transmitted while the electronic device 101 performs the first cellular communication may be greater than that of a signal transmitted while the electronic device 101 performs the second cellular communication. Accordingly, power consumed while the electronic device 101 performs the first cellular communication may be greater than power consumed while performing the second cellular communication. In addition, the temperature of the electronic device 101 may increase due to heat generated while performing the first cellular communication. The electronic device 101 may reduce power consumption and/or heating through switching from the first cellular communication to the second cellular communication according to whether a designated condition is satisfied.

Figure 5B:
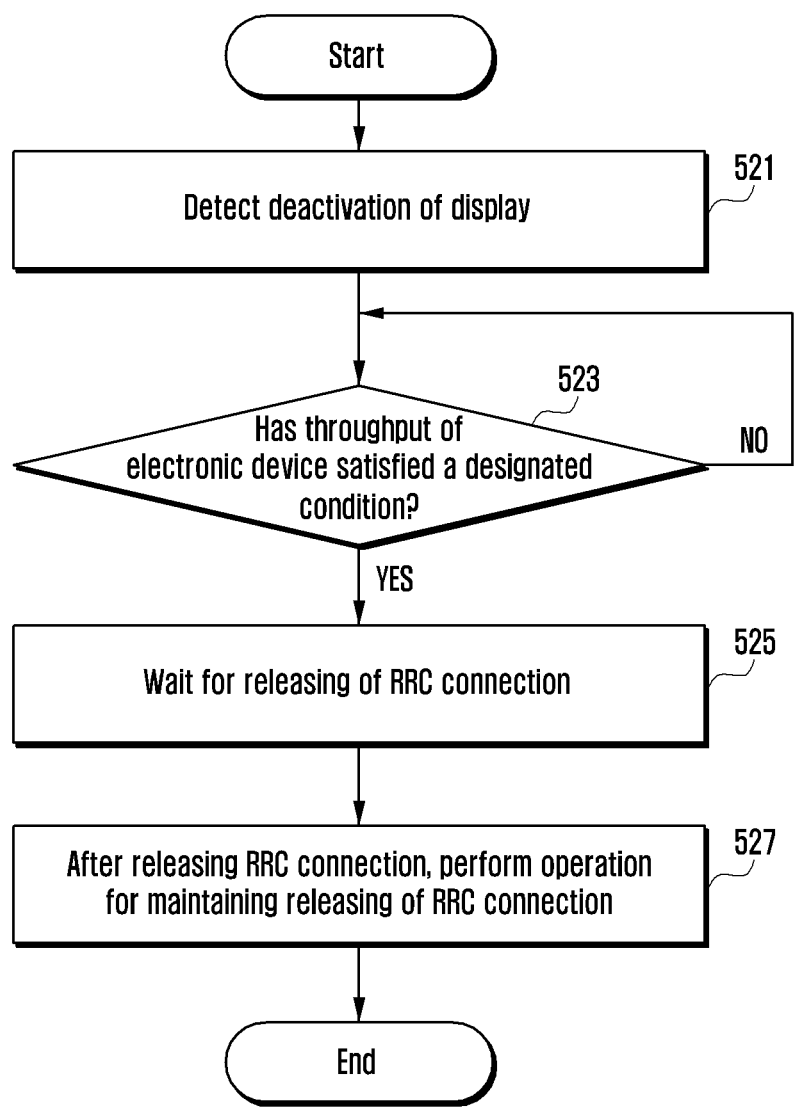
FIG. 5B illustrates an embodiment in which an electronic device releases an RRC connection of second cellular communication according to an embodiment of the disclosure.

FIG. 5B illustrates an operation of an electronic device upon a call connection and a call disconnection according to an embodiment of the disclosure.

In operation 521, an electronic device (e.g., the electronic device 101 of FIG. 5A) may detect deactivation of a display (e.g., the display module 160 of FIG. 1).

The deactivation of the display 160 may mean deactivation of at least partial function (e.g., a screen display function) of the display 160. According to various embodiments of the disclosure, a state in which the screen display function is deactivated even in a case where another partial function (e.g., an always on display (AOD) function or a touch input function) of the display 160 is activated may be defined as deactivation of the display 160.

According to an embodiment of the disclosure, the display 160 may be switched into the deactivate state in response to detection of pressing on a lock button of the electronic device 101 by a user. According to another embodiment of the disclosure, the display 160 may be switched into the deactivated state in response to a user input on the display 160, which has not received for a designated time. In addition to the embodiment above, the display 160 may be switched into the deactivated state according to various schemes.

In operation 523, upon detection of switching to the deactivated state of the display 160, the electronic device 101 may identify whether a throughput of the electronic device 101 satisfies a designated condition.

The throughput of the electronic device 101 may be defined by the amount of traffic of data transmitted and/or received per unit time. In a state where the display 160 is deactivated, the electronic device 101 may monitor (or track) the amount of traffic generated by an application (or a background application) that is being executed. The electronic device 101 may monitor (or track) the amount of traffic of data transmitted or received via the first cellular communication and/or the second cellular communication, and identify whether the throughput satisfies the designated condition. The designated condition may include a condition in which the throughput has a value equal to or less than (or a value less than) a designated value (e.g., 35 Mbps).

In response to the throughput of the electronic device 101, which has failed to satisfy the designated condition in operation 523-N, the electronic device 101 may monitor the throughput of the electronic device 101 and identify whether the designated condition is satisfied every designated time.

In operation 525, in response to the identification that the throughput of the electronic device 101 satisfies the designated condition in operation 523-Y, the electronic device 101 may wait for releasing of a radio resource control (RRC) connection (RRC releasing) of the first cellular communication.

The releasing of the RRC connection of the first cellular communication may be performed when no data (or a packet) is transmitted and/or received for a designated time (e.g., 10 seconds) of a timer (e.g., an RRC inactivity timer) of a network (e.g., the second network 294 of FIG. 2) of the first cellular communication.

In operation 527, the electronic device 101 may perform an operation for maintaining the releasing of the RRC connection after the releasing of the RRC connection is performed.

The operation for maintaining the releasing of the RRC connection may include an operation of skipping (or ignoring) transmission of a B1 event measurement report (B1 measurement report) indicating that a result of measurement of the quality of a signal transmitted (or broadcasted) by a node (e.g., the first node 450 of FIG. 5A) supporting the first cellular communication shows satisfying a designated condition (e.g., the quality exceeds a designated value).

The network 294 having received the B1 event measurement report may perform a series of operations a connection with the electronic device 101 via the first cellular communication. Accordingly, the electronic device 101 may not transmit the B1 event measurement report so as to prevent the connection with the network 294 via the first cellular communication.

The electronic device 101 may release the connection of the first cellular communication and perform data transmission and/or reception via second cellular communication, so as to reduce power consumption.

The above-described embodiment may be applied under the assumption that the releasing of the RRC connection of the first cellular communication is smoothly performed. However, a situation in which the releasing of the RRC connection of the first cellular communication fails to be smoothly performed. For example, a time interval (e.g., four seconds) for data transmitted or received to or from the electronic device 101 is shorter than a designated time interval (e.g., 10 seconds) of a timer of the network 294 of the first cellular communication, the releasing of the RRC connection may not be performed, regardless of the size of the data transmitted or received to or from the electronic device 101. Even though the throughput satisfies the designated condition, a phenomenon in which the RRC connection of the first cellular communication is continuously maintained and the power consumption increases may occur in the electronic device 101.

In the embodiment above, the releasing of the RRC connection and the maintaining of the releasing of the RRC connection may mean releasing of the connection of the first cellular communication and maintaining of the releasing of the connection of the first cellular communication.

Hereinafter, an embodiment in which the electronic device 101 may perform the releasing of the RRC connection of the first cellular communication in response to the satisfying the designated condition is described.

Figure 6:
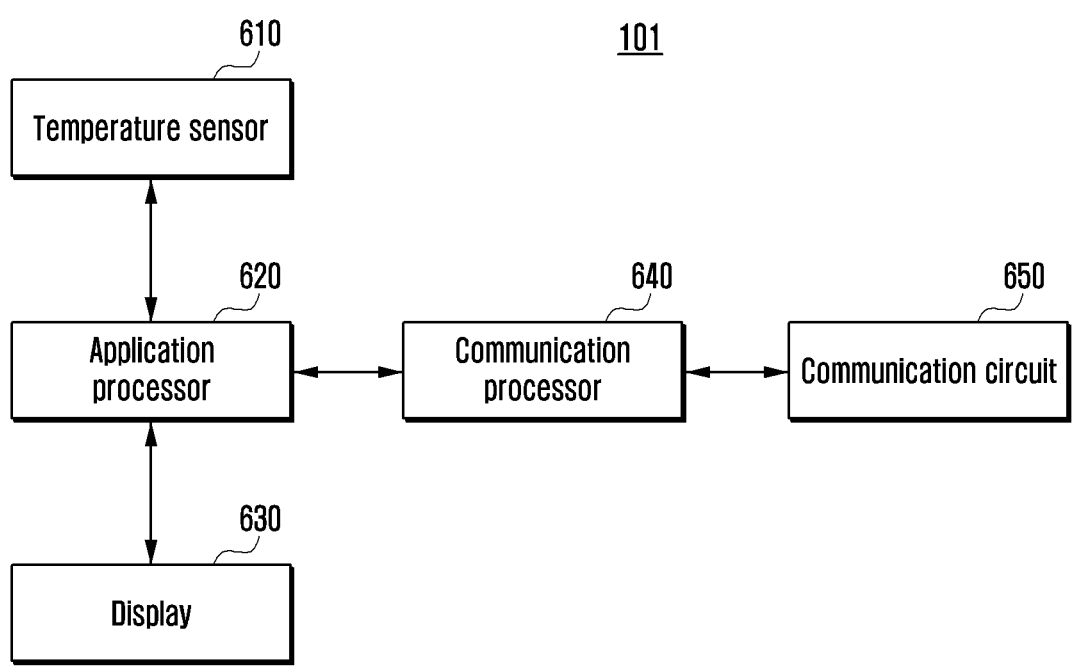
FIG. 6 is a block diagram illustrating an electronic device according to an embodiment of the disclosure.

FIG. 6 illustrates an electronic device according to an embodiment of the disclosure.

Referring to FIG. 6, an electronic device (e.g., the electronic device 101 of FIG. 1) according to various embodiments of the disclosure may include a temperature sensor 610 (e.g., the sensor module 176 of FIG. 1), an application processor 620 (e.g., the processor 120 of FIG. 1), a display 630 (e.g., the display module 160 of FIG. 1), a communication processor 640 (e.g., the first communication processor 212 of FIG. 2 and/or the second communication processor 244), and/or a communication circuit 650 (e.g., the wireless communication module 192 of FIG. 1).

The temperature sensor 610 may measure the temperature of at least a part (e.g., an element (e.g., a housing and/or a component) of the electronic device 101) of the electronic device 101. Information on the temperature measured by the temperature sensor 610 may be transmitted to the application processor 620.

The application processor 620 may control various elements of the electronic device 101. A detailed operation thereof will be described below.

The display 630 may display various still images and/or videos, based on control of the application processor 620. The display 630 may display a screen provided by a foreground application. The foreground application may be defined as an application displayed on the display 630, and a background application may be defined as an application that is not displayed on the display 630. According to a partial condition (e.g., an input of a lock button of the electronic device 101 by a user), the foreground application may operate as the background application. For example, a music playback application may be a foreground application capable of displaying information related to music playback on the display 630, and may operate as a background application capable of playing music without providing a separate screen in a locked mode.

The communication processor 640 may perform data transmission and/reception via the first cellular communication and/or the second cellular communication. The communication processor 640 may be connected to a first node (e.g., the first node 450 of FIG. 5A) via the first cellular communication, or may be connected to a second node (e.g., the second node 410 of FIG. 5A) via the second cellular communication. The communication processor 640 may transmit user data received from the application processor 620 via the first cellular communication and/or the second cellular communication, and may transmit user data received via the first cellular communication and/or the second cellular communication to the application processor 620.

The first cellular communication corresponds to one of various cellular communication schemes which can be supported by the electronic device 101, and may mean, for example, a communication scheme on the second network 294 of FIG. 2. For example, the first cellular communication may be a communication scheme using the 5G mobile communication scheme (e.g., a new radio).

The second cellular communication corresponds to one of various cellular communication schemes which can be supported by an electronic device (e.g., the electronic device of FIG. 1), and may mean, for example, a communication scheme on the first network 292 of FIG. 2. For example, the second cellular communication may correspond to a communication scheme using the 4G mobile communication scheme (e.g., long-term evolution).

The communication circuit 650 corresponds to a communication circuit supporting the first cellular communication and/or the second cellular communication, and may provide, to the electronic device 101, communication with an external electronic device (e.g., the external electronic device 104 of FIG. 1) via the first cellular communication and/or the second cellular communication.

According to various embodiments of the disclosure, in order to reduce heating and/or power consumption in a state in which a radio resource control (RRC) connection is established via the first cellular communication, the electronic device 101 may perform releasing of the RRC connection of the first cellular communication, and perform an RRC connection of the second cellular communication. Hereinafter, a detailed description of an embodiment of releasing the RRC connection of the first cellular communication will be made.

The application processor 620 may identify the state of the display 630 while being RRC-connected via the first cellular communication. The application processor 620 may identify whether the display 630 is in a deactivated state. Alternatively, the application processor 620 may detect that the state of the display 630 is switched from an activated state to the deactivated state, and identify whether the deactivated state of the display 630 is maintained for a designated time or longer.

The deactivation of the display 630 may mean deactivation of at least partial function (e.g., a screen display function) of the display 630. According to various embodiments of the disclosure, a state in which the screen display function is deactivated even in a case where another partial function (e.g., an always on display (AOD) function or a touch input recognition function) of the display 630 is activated may be defined as deactivation of the display 630.

According to an embodiment of the disclosure, the display 630 may be switched into the deactivated state in response to detection of pressing on a lock button of the electronic device 101 by a user. According to another embodiment of the disclosure, the display 630 may be switched into the deactivated state in response to a user input on the display 630, which has failed to be received for a designated time or longer. In addition to the embodiment above, the display 630 may be switched into the deactivated state according to various schemes.

The application processor 620 may identify whether the temperature measured by the temperature sensor 610 and/or the throughput of data transmission satisfies a designated condition in response to the identification of the deactivated state of the display 630. Alternatively, the application processor 620 may identify whether the temperature measured by the temperature sensor 610 and/or the throughput of the data transmission satisfies a designated condition in response to the identification that the deactivation state of the display 630 is maintained for a designated time or longer.

The temperature measured by the temperature sensor 610 may include the temperature of a part of the electronic device 101 having the temperature sensor 610 disposed thereon. The application processor 620 may identify whether the temperature measured by the temperature sensor 610 satisfies a designated condition. The designated condition may include a condition in which the temperature measured by the temperature sensor 610 has a value equal or greater than (or a number greater than) a designated value (e.g., 35.5 degrees Celsius).

The throughput of the data transmission may be defined as the amount of traffic of the data transmitted and/or received per unit time. The application processor 620 may monitor (or track) the amount of traffic generated by an application (or a background application) that is being executed, in a state in which the display 630 is deactivated. The application processor 620 may monitor (or track) the amount of traffic of data transmitted or received via the first cellular communication and/or the second cellular communication, and identify whether the throughput satisfies a designated condition. The designated condition may include a condition in which the throughput has a value equal to or less than (e.g., a value less than) a designated value (e.g., 10 Mbps).

The application processor 620 may identify whether the temperature and/or the throughput has failed to satisfy a designated condition, and maintain the RRC connection of the first cellular communication. When the temperature and/or the throughput has failed to satisfy the designated condition, it may mean that the temperature of the electronic device 101 has a value equal to or less than the designated value, or the throughput has a value equal to or greater than the designated value. The maintaining of the RRC connection of the first cellular communication may mean that the electronic device 101 may perform data transmission and/or reception via the first cellular communication. In response to the identification that the temperature and/or the throughput has failed to satisfy the designated condition, the application processor 620 may maintain the RRC connection of the first cellular communication, continuously identify the temperature and/or the throughput, and identify whether the designated condition is satisfied.

The application processor 620 may identify that the temperature and/or the throughput satisfies the designated condition, and control the communication processor 640 to perform a series of operations for relating of the RRC connection of the first cellular communication.

The communication processor 640 may perform one or more operations for performing the releasing of the RRC connection of the first cellular communication. According to an embodiment of the disclosure, the communication processor 640 may transmit an A2 event measurement report (A2 measurement report) configured to be reported when the strength of a signal transmitted by a node (e.g., the first node 450 of FIG. 5A) connected via the first cellular communication has a value less than a specific value. The A2 event measurement report transmitted by the communication processor 640 may be transmitted regardless of the strength of the signal transmitted (or broadcasted) by the node 450 connected via the first cellular communication. For example, the communication processor 640 may transmit the A2 event measurement report in a situation in which the strength of the signal transmitted by the node 450 connected via the first cellular communication has a value greater than a specific value.

A network (e.g., the second network 294 of FIG. 2) of the first cellular communication, which has received the A2 event measurement report, may determine whether the first cellular communication is released, according to the A2 event measurement report has been received. The network 294 of the first cellular communication may receive the A2 event measurement report, and release the RRC connection between the electronic device 101 and the network 294 of the first cellular communication.

After the transmission of the A2 event measurement report, the communication processor 640 may identify whether the RRC connection is released for a designated time, and when the RRC connection is not released, the communication processor may transmit, to the network 294 of the first cellular communication, a secondary cell group failure (SCGF) indicating that the connection of the first cellular communication has failed. The SCGF transmitted by the communication processor 640 may be transmitted regardless of the strength of the signal transmitted (or broadcasted) by the node 450 connected via the first cellular communication. The network 294 of the first cellular communication may receive the SCGF and release the RRC connection between the electronic device 101 and the network 294 of the first cellular communication.

The communication processor 640 may transmit the SCGF without the A2 event measurement report, and perform relatively faster releasing of the first cellular communication.

After the completion of the releasing of the first cellular communication, the communication processor 640 may perform a series of operations for the RRC releasing of the first cellular communication.

The communication processor 640 may not transmit the B1 event measurement report configured to be reported when the strength of the signal transmitted by a node (e.g., the first node 450 of FIG. 5A) connected via the first cellular communication has a value greater than a specific value, as a part of the one or more operations for remaining the releasing of the first cellular communication.

The network (e.g., the second network 294 of FIG. 2) of the first cellular communication having received the B1 event measurement report may determine whether the RRC connection of the first cellular communication is made, according to whether the B1 event measurement report has been received. When the network 294 of the first cellular communication has received the B1 event measurement report, the network may perform again the RRC connection between the network 294 of the first cellular communication and the electronic device 101. Accordingly, the communication processor 640 may maintain a released state of the first cellular communication, without transmission of the B1 event measurement report.

The above-described embodiment describes that the RRC connection of the first cellular communication is released and/or the releasing of the RRC connection is maintained, based on the throughput and/or the temperature, but the electronic device 101 may release and/or maintain the releasing of the RRC connection of the first cellular communication based on various states, not being limited by the throughput and/or temperature.

The electronic device 101 may include a memory (e.g., the memory 130 of FIG. 1) transitorily and/or non-transitorily storing a list of applications for which the releasing of the RRC connection of the first cellular communication is prohibited. The list of applications may be generated based on a selection of a user of the electronic device 101, and may be received from a server (e.g., the electronic device 104 of FIG. 1) existing at the outside of the electronic device 101.

Alternatively, the list of applications may be generated based on the characteristic of a server provided by the application. For example, according to the switching of the connected cellular communication of the electronic device 101, the list of applications may include an application providing a service (e.g., voice over NR (VoNR)) which is difficult to be smoothly performed.

When detecting the deactivated state of the display 630 in a state where an application included in the list of applications for which the releasing of the RRC connection of the first cellular communication is prohibited is executed, the application processor 620 may maintain the connection of the first cellular communication without the releasing of the connection of the first cellular communication, regardless of whether the throughput and/or the temperature satisfies the designated condition.

According to another embodiment of the disclosure, the electronic device 101 may include a memory (e.g., the memory 130 of FIG. 1) transitorily or non-transitorily storing the list of applications for which the releasing of the connection of the first cellular communication is allowed. The list of applications may be generated based on the selection of the user of the electronic device 101, and may be received by a server (e.g., the electronic device 104 of FIG. 1) existing at the outside of the electronic device 101.

Alternatively, the list of applications may be generated based on the characteristic of the service provided by the application. For example, according to the switching of the connected cellular communication of the electronic device 101, the list of applications may include an application providing a service which can be smoothly performed (e.g., a streaming service corresponding to a service of receiving data every designated time).

While an application included in the list of applications for which the releasing of the first cellular communication is allowed is being executed, the application processor 620 may identify whether the throughput and/or the temperature satisfies a designated condition in response to the identification that the display 630 is in the deactivated state for a designated time or longer, and may perform a series of operations for the releasing of the RRC connection of the first cellular communication in response to the throughput and/or the temperature satisfying the designated condition.

The electronic device 101 may support both the embodiment disclosed in the description of FIG. 6 above and the embodiment disclosed in the description of FIG. 5B above.

The application processor 620 may detect deactivation of the display 630, and identify whether the throughput satisfies a designated condition. In response to the throughput satisfying the designated condition, the application processor may wait the releasing of the connection of the first cellular communication.

The releasing of the connection of the first cellular communication may be performed when transmission and/or reception of data (or a packet) is not performed for a designated time (e.g., 10 seconds) of a timer (e.g., an RRC inactivity timer) of a network (e.g., the second network 294 of FIG. 2) of the first cellular communication.

The application processor 620 may not identify whether the throughput and/or the temperature satisfies the designated condition, upon reception of information indicating the releasing of the connection of the first cellular communication, from the communication processor 640.

When the application processor 620 has failed to receive the information indicating the releasing of the connection of the first cellular communication, the application processor may identify whether the throughput and/or the temperature satisfies the designated condition, and when the throughput and/or the temperature satisfies the designated condition, the application processor may perform a series of operations (e.g., A2 measurement report transmission and/or SCGF transmission) for the releasing of the connection of the first cellular communication.

When an application performing transmission and/or reception of data every time interval that is shorter than a designated time of a timer of a network of the first cellular communication is executed, in a situation where the releasing of the connection of the first cellular communication cannot be performed, the electronic device 101 may perform prompt releasing of the connection of the first cellular communication through the transmission of the A2 measurement report and/or the SCGF, and may reduce power consumption and/or heating.

In the above-described embodiment of the disclosure, the releasing of the RRC connection and the maintaining of the releasing of the RRC connection may mean releasing of the connection of the first cellular communication and maintaining of the releasing of the connection of the first cellular communication.

Figure 7:
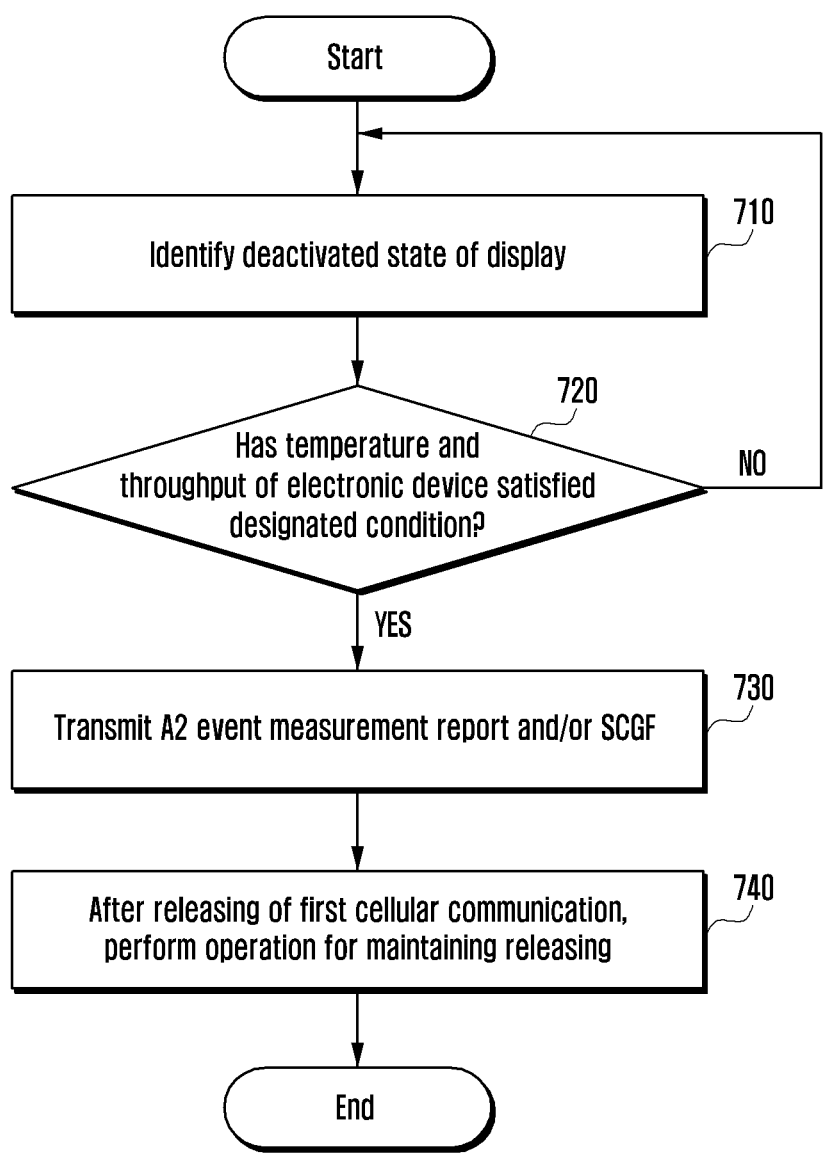
FIG. 7 illustrates an embodiment in which an electronic device releases an RRC connection of second cellular communication according to an embodiment of the disclosure.

FIG. 7 illustrates an embodiment 700 of releasing an RRC connection of second cellular communication by an electronic device according to an embodiment of the disclosure.

Referring to FIG. 7, in an operation 710, an electronic device (e.g., the electronic device 101 of FIG. 6) may identify a deactivated state of a display (e.g., the display 630 of FIG. 6).

The electronic device 101 may identify the state of the display 630 while being connected via the first cellular communication. The electronic device 101 may detect that the display 630 has been switched from an activated state to a deactivated state, and identify whether the deactivated state of the display 630 is maintained for a designated time.

The deactivation of the display 630 may mean deactivation of at least partial function (e.g., a screen display function) of the display 630. According to various embodiments of the disclosure, a state where the screen display function is deactivated may be defined as deactivation of the display 630 even in a case where another partial function (e.g., an always on display (AOD) function or a touch input recognition function) of the display 630 is activated.

According to an embodiment of the disclosure, in response to detection of pressing on a lock button of the electronic device 101 by a user, the display 630 may be switched into the deactivated state. According to another embodiment of the disclosure, the display 630 may be switched into the deactivated state in response to a user input on the display 630, which has failed to be received for a designated time or longer. In addition to the embodiment above, the display 630 may be switched into the deactivated state according to various schemes.

In operation 720, the electronic device 101 may identify whether a temperate and/or a throughput of the electronic device 101 satisfies a designated condition.

In response to identification that the deactivated state of the display 630 is maintained for a designated time or longer, the electronic device 101 may identify whether the temperature measured by a temperature sensor (e.g., the temperature sensor 610 of FIG. 6) and/or the throughput of data transmission satisfies a designated condition.

The temperature measured by the temperature sensor 610 may include the temperature of a part of the electronic device 101 having the temperature sensor 610 disposed thereon. The electronic device 101 may identify whether the temperature measured by the temperature sensor 610 satisfies a designated condition. The designated condition may include a condition in which the temperature measured by the temperature sensor 610 has a value equal or greater than (or a number greater than) a designated value (e.g., 35.5 degrees Celsius).

The throughput of the data transmission may be defined as the amount of traffic of the data transmitted and/or received per unit time. The electronic device 101 may monitor (or track) the amount of traffic generated by an application (or a background application) that is being executed, in a state in which the display 630 is deactivated. The application processor 620 may monitor (or track) the amount of traffic of data transmitted or received via the first cellular communication and/or the second cellular communication, and identify whether the throughput satisfies a designated condition. The designated condition may include a condition in which the throughput has a value equal to or less than (e.g., a value less than) a designated value (e.g., 10 Mbps).

In response to the temperature and/or the throughput of the electronic device 101, which has failed to satisfy the designated condition (operation 720-N), the electronic device 101 may perform operation 710 again.

The electronic device 101 may identify that the temperature and/or the throughput has failed to satisfy the designated condition, and maintain the connection of the first cellular communication. When the temperature and/or the throughput has failed to satisfy the designated condition, it may mean that the temperature of the electronic device 101 has a value equal to or less than the designated value, or the throughput has a value equal to or greater than the designated value. The maintaining of the RRC connection of the first cellular communication may mean that the electronic device 101 may perform data transmission and/or reception via the first cellular communication. In response to the identification that the temperature and/or the throughput has failed to satisfy the designated condition, the electronic device 101 may maintain the connection of the first cellular communication, continuously identify the temperature and/or the throughput, and identify whether the designated condition is satisfied.

In operation 730, in response to the temperature and/or the throughput of the electronic device 101, which satisfies the designated condition (operation 720-Y), the electronic device 101 may transmit an A2 event measurement report and/or an SCGF.

The electronic device 101 may identify that the temperature and/or the throughput satisfies the designated condition, and control the communication processor 640 to perform a series of operations for releasing the connection of the first cellular communication.

As a part of one or more operations for performing the releasing of the connection of the first cellular communication, the electronic device 101 may transmit an A2 event measurement report (A2 measurement report) configured to be reported when the strength of a signal transmitted by a node (e.g., the first node 450 of FIG. 5A) connected via the first cellular communication has a value less than a specific value. The A2 event measurement report transmitted by the electronic device 101 may be transmitted regardless of the strength of the signal transmitted (or broadcasted) by the node 450 connected via the first cellular communication.

A network (e.g., the second network 294 of FIG. 2) of the first cellular communication, which has received the A2 event measurement report, may determine whether to release an RRC connection of the first cellular communication according to whether the A2 event measurement report has been received. The network 294 of the first cellular communication may receive the A2 event measurement report, and release the connection between the electronic device 101 and the network 294 of the first cellular communication.

After the transmission of the A2 event measurement report, the electronic device 101 may identify whether the connection of the first cellular communication is released for a designated time, and when the RRC connection is not released, the electronic device may transmit, to the network 294 of the first cellular communication, a secondary cell group failure (SCGF) indicating that the connection of the first cellular communication has failed. The SCGF transmitted by the electronic device 101 may be transmitted regardless of the strength of the signal transmitted (or broadcasted) by the node 450 connected via the first cellular communication. The network 294 of the first cellular communication may receive the SCGF and release the connection between the electronic device 101 and the network 294 of the first cellular communication.

The electronic device 101 may transmit the SCGF without the A2 event measurement report, and perform relatively faster releasing of the connection of the first cellular communication.

After the completion of the releasing of the first cellular communication, the electronic device 101 may perform, in operation 740, a series of operations for the releasing of the connection of the first cellular communication.

After the completion of the releasing of the connection of the first cellular communication, the electronic device 101 may perform a series of operations for maintaining the releasing of the connection of the first cellular communication.

The electronic device 101 may not transmit a B1 event measurement report (B1 measurement report) configured to be reported when the strength of the signal transmitted by a node (e.g., the first node 450 of FIG. 5A) connected via the first cellular communication has a value greater than a specific value, as a part of the one or more operations for remaining the releasing of the connection of the first cellular communication.

The network (e.g., the second network 294 of FIG. 2) of the first cellular communication having received the B1 event measurement report may determine whether the RRC connection of the first cellular communication is made, according to whether the B1 event measurement report is received. When the network 294 of the first cellular communication has received the B1 event measurement report, the network may perform again the connection between the network 294 of the first cellular communication and the electronic device 101. Accordingly, the communication processor 640 may maintain a released state of the connection of the first cellular communication, without transmission of the B1 event measurement report.

In the above-described embodiment of the disclosure, the releasing of the RRC connection and the maintaining of the releasing of the RRC connection may mean releasing of the connection of the first cellular communication and maintaining of the releasing of the connection of the first cellular communication.

Figure 8:
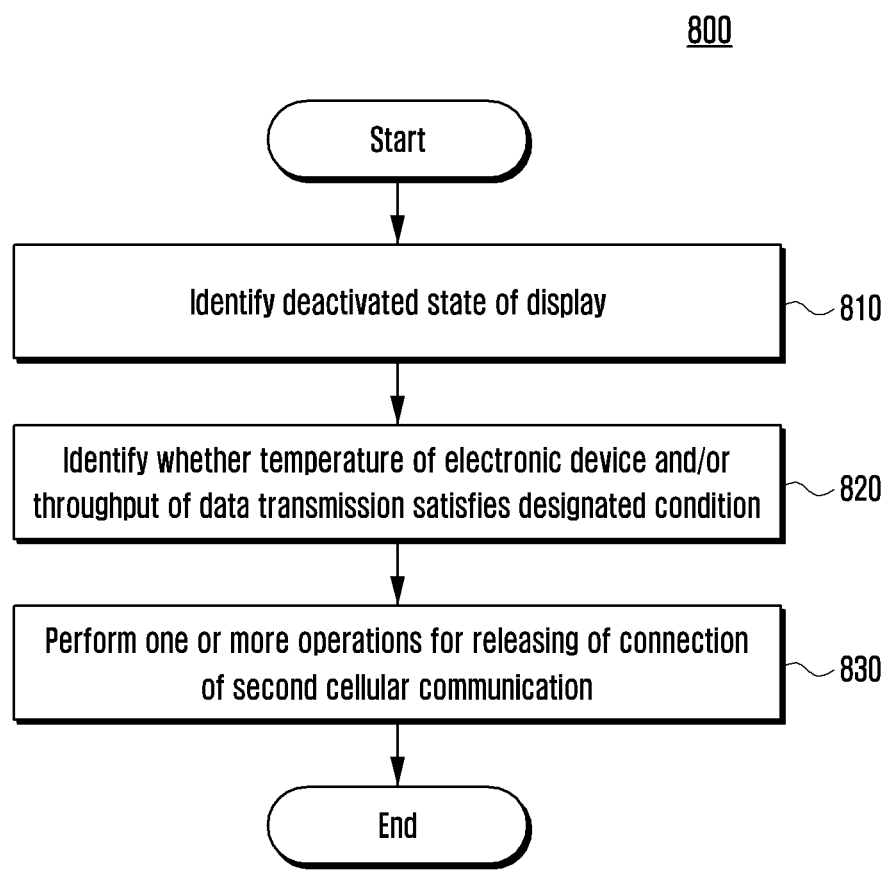
FIG. 8 is a flowchart illustrating a method of operating an electronic device according to an embodiment of the disclosure.

FIG. 8 is a flowchart 800 illustrating a method of operating an electronic device according to an embodiment of the disclosure.

Referring to FIG. 8, in operation 810, an electronic device (e.g., the electronic device 101 of FIG. 6) may identify that a display (e.g., the display 630 of FIG. 6) is in a deactivated state.

The electronic device 101 may identify the state of the display 630 while being connected via first cellular communication. The electronic device 101 may detect that the state of the display 630 has been switched from an activated state to a deactivated state, and identify whether the deactivated state of the display 630 is maintained for a designated time or longer.

The deactivation of the display 630 may mean deactivation of at least partial function (e.g., a screen display function) of the display 630. According to various embodiments of the disclosure, a state where the screen display function is deactivated may be defined as deactivation of the display 630 even in a case where another partial function (e.g., an always on display (AOD) function or a touch input recognition function) of the display 630 is activated.

According to an embodiment of the disclosure, in response to detection of pressing on a lock button of the electronic device 101 by a user, the display 630 may be switched into the deactivated state. According to another embodiment of the disclosure, the display 630 may be switched into the deactivated state in response to a user input on the display 630, which has failed to be received for a designated time or longer. In addition to the embodiment above, the display 630 may be switched into the deactivated state according to various schemes.

In operation 820, the electronic device 101 may identify whether a temperate and/or a throughput of the electronic device 101 satisfies a designated condition.

In response to identification that the deactivated state of the display 630 is maintained for a designated time or longer, the electronic device 101 may identify whether the temperature measured by a temperature sensor (e.g., the temperature sensor 610 of FIG. 6) and/or the throughput of data transmission satisfies a designated condition.

The temperature measured by the temperature sensor 610 may include the temperature of a part of the electronic device 101 having the temperature sensor 610 disposed thereon. The electronic device 101 may identify whether the temperature measured by the temperature sensor 610 satisfies a designated condition. The designated condition may include a condition in which the temperature measured by the temperature sensor 610 has a value equal or greater than (or a number greater than) a designated value (e.g., 35.5 degrees Celsius).

The throughput of the data transmission may be defined as the amount of traffic of the data transmitted and/or received per unit time. The electronic device 101 may monitor (or track) the amount of traffic generated by an application (or a background application) that is being executed, in a state in which the display 630 is deactivated. The application processor 620 may monitor (or track) the amount of traffic of data transmitted or received via the first cellular communication and/or the second cellular communication, and identify whether the throughput satisfies a designated condition. The designated condition may include a condition in which the throughput has a value equal to or less than (e.g., a value less than) a designated value (e.g., 10 Mbps).

The electronic device 101 may perform operation 810 again in response to the temperature and/or the throughput of the electronic device 101, which has failed to satisfy the designated condition.

The electronic device 101 may identify whether the temperature and/or the throughput has failed to satisfy a designated condition, and maintain the connection of the first cellular communication. When the temperature and/or the throughput has failed to satisfy the designated condition, it may mean that the temperature of the electronic device 101 has a value equal to or less than the designated value, or the throughput has a value equal to or greater than the designated value. The maintaining of the connection of the first cellular communication may mean that the electronic device 101 may perform data transmission and/or reception via the first cellular communication. In response to the identification that the temperature and/or the throughput has failed to satisfy the designated condition, the electronic device 101 may maintain the connection of the first cellular communication, continuously identify the temperature and/or the throughput, and identify whether the designated condition is satisfied.

In operation 830, in response to the temperature and/or the throughput of the electronic device, which has satisfied the designated condition, the electronic device 101 may perform a series of operations for releasing of the connection of the first cellular communication.

As a part of one or more operations for performing the releasing of the connection of the first cellular communication, the electronic device 101 may transmit an A2 event measurement report (A2 measurement report) configured to be reported when the strength of a signal transmitted by a node (e.g., the first node 450 of FIG. 5A) connected via the first cellular communication has a value less than a specific value. The A2 event measurement report transmitted by the electronic device 101 may be transmitted regardless of the strength of the signal transmitted (or broadcasted) by the node 450 connected via the first cellular communication.

A network (e.g., the second network 294 of FIG. 2) of the first cellular communication, which has received the A2 event measurement report, may determine whether to release the connection of the first cellular communication according to whether the A2 event measurement report has been received. The network 294 of the first cellular communication may receive the A2 event measurement report, and release the connection between the electronic device 101 and the network 294 of the first cellular communication.

After the transmission of the A2 event measurement report, the electronic device 101 may identify whether the connection is released for a designated time, and when the connection is not released, the electronic device may transmit, to the network 294 of the first cellular communication, a secondary cell group failure (SCGF) indicating that the connection of the first cellular communication has failed. The SCGF transmitted by the electronic device 101 may be transmitted regardless of the strength of the signal transmitted (or broadcasted) by the node 450 connected via the first cellular communication, as a part of the one or more operations for the releasing of the RRC connection. The network 294 of the first cellular communication may receive the SCGF and release the connection between the electronic device 101 and the network 294 of the first cellular communication.

The electronic device 101 may transmit the SCGF without the A2 event measurement report, and perform relatively faster releasing of the connection of the first cellular communication.

An electronic device according to various embodiments of the disclosure may include a temperature sensor configured to measure a temperature of at least a part of the electronic device, a display, a communication circuit supporting first cellular communication and/or second cellular communication, an application processor, and a communication processor, wherein the application processor identifies whether a deactivated state of the display is maintained for a designated time or longer while being radio resource control (RRC)-connected via the first cellular communication, in response to the deactivated state maintained for the designated time or longer, identifies whether each of the temperature measured by the temperature sensor and a throughput of data transmission via the first cellular communication satisfies a designated condition, and in response to the temperature and the throughput each satisfying the designated condition, controls the communication processor to perform one or more operations for performing releasing of the RRC connection of a network connected via the first cellular communication.

In the electronic device of various embodiments of the disclosure, as a part of the one or more operations for performing the releasing of the RRC connection, the communication processor may be configured to transmit a measurement report (A2 measurement report) configured to be reported when a strength of a signal transmitted by a node connected via the first cellular communication has a value less than a specific value.

In the electronic device of various embodiments of the disclosure, as a part of the one or more operations for performing the releasing of the RRC connection, the communication processor may be configured to transmit a secondary cell group failure (SCGF) indicating a failure in the connection of the first cellular communication.

In the electronic device of various embodiments of the disclosure, the communication processor may be configured to perform the one or more operations for maintaining the releasing of the RRC connection after the releasing of the RRC connection.

In the electronic device of various embodiments of the disclosure, as a part of the one or more operations for maintaining the releasing of the RRC connection, the communication processor may be configured not to transmit a B1 event measurement report (B1 measurement report) configured to be reported when a strength of a signal transmitted by a node connected via the first cellular communication has a value greater than a specific value.

In the electronic device of various embodiments of the disclosure, in response to identification that an application being executed on the electronic device corresponds to a designated application, the application processor may control the communication processor not to perform the one or more operations for performing the releasing of the RRC connection of a network connected via the first cellular communication.

In the electronic device of various embodiments of the disclosure, the designated application may include an application supporting a call (voice over NR (VoNR)) via the first cellular communication.

In the electronic device of various embodiments of the disclosure, in response to identification that an application being executed on the electronic device is a designated application, the application processor may be configured to identify whether the deactivated state of the display is maintained for a designated time or longer.

The electronic device of various embodiments of the disclosure may further include a memory storing a list of applications for which releasing of an RRC connection of the first cellular communication is prohibited according to satisfying the designated condition.

In the electronic device of various embodiments of the disclosure, the application processor may be configured to, in response to switching of a state of the display into a deactivated state, identify whether the throughput satisfies a designated condition, in response to the throughput satisfying the designated condition, wait for releasing of the RRC connection, and when the RRC connection has not been released for a designated time, perform one or more operations for performing the releasing of the RRC connection.

A method of operating an electronic device according to various embodiments of the disclosure may include identifying whether a deactivated state of a display is maintained for a designated time or longer in a state of a radio resource control (RRC) connection via first cellular communication, in response to the deactivated state maintained for the designated time or longer, identifying whether each of a temperature measured by a temperature sensor of the electronic device and a throughput of data transmission via the first cellular communication satisfies a designated condition, and in response to the temperature and the throughput satisfying the designated condition, performing one or more operations for performing releasing of the RRC connection of a network connected via the first cellular communication.

In the method of operating the electronic device of various embodiments of the disclosure, the one or more operations for performing the releasing of the RRC connection may include transmitting an A2 event measurement report (A2 measurement report) configured to be reported when a strength of a signal transmitted by a node connected via the first cellular communication has a value less than a specific value.

In the method of operating the electronic device of various embodiments of the disclosure, the one or more operations for performing the releasing of the RRC connection may include transmitting a secondary cell group failure (SCGF) indicating a failure in a connection of the first cellular communication.

The method of operating the electronic device of various embodiments of the disclosure may further include performing the one or more operations for maintaining the releasing of the RRC connection after the releasing of the RRC connection.

In the method of operating the electronic device of various embodiments of the disclosure, the one or more operations for performing the releasing of the RRC connection may further include, as a part of the one or more operations for maintaining of the releasing of the RRC connection, controlling a communication processor not to transmit a B1 event measurement report (B1 measurement report) configured to be reported when a strength of a signal transmitted by a node connected via the first cellular communication has a value greater than a specific value.

The method of operating the electronic device of various embodiments of the disclosure may further include, in response to identification that an application being executed on the electronic device corresponds to a designated application, controlling the communication processor not to perform the one or more operations for performing the releasing of the RRC connection of a network connected via the first cellular communication.

In the method of operating the electronic device of various embodiments of the disclosure, the designated application may include an application supporting a call (voice over NR (VoNR)) via the first cellular communication.

In the method of operating the electronic device of various embodiments of the disclosure, the identifying of whether the deactivated state of the display is maintained for a designated time or longer may include in response to identification that an application being executed on the electronic device is a designated application, identifying whether the deactivated state of the display is maintained for a designated time or longer.

The method of operating the electronic device of various embodiments of the disclosure may further include receiving and/or storing a list of applications for which releasing of an RRC connection of the first cellular communication is prohibited according to satisfying the designated condition.

The method of operating the electronic device of various embodiments of the disclosure may further include in response to switching of a state of the display into a deactivated state, identifying whether the throughput satisfies a designated condition, in response to the throughput satisfying the designated condition, waiting for releasing of the RRC connection, and when the RRC connection has not been released for a designated time, performing one or more operations for performing the releasing of the RRC connection.

The embodiment above is described as an embodiment of releasing a connection of first cellular communication and connecting second cellular communication to reduce power consumption and heating by an electronic device. An electronic device according to various embodiments of the disclosure may change an operation mode of the first cellular communication while maintaining the connection of the first cellular communication, so as to reduce power consumption and heating. Hereinafter, a detailed description of an embodiment will be made.

Figure 9:
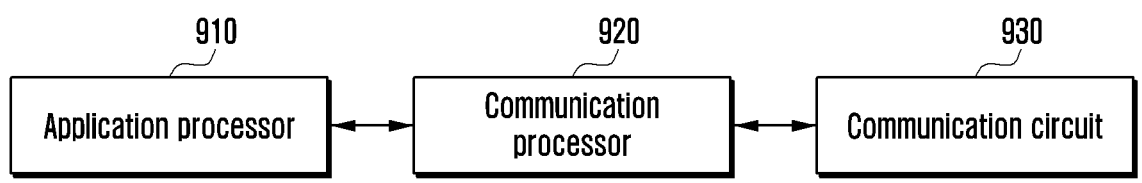
FIG. 9 is a block diagram illustrating an electronic device according to embodiment of the disclosure.

FIG. 9 is a block diagram illustrating an electronic device according to an embodiment of the disclosure.

Referring to FIG. 9, an electronic device (e.g., the electronic device 101 of FIG. 1) according to various embodiments of the disclosure may include an application processor 910 (e.g., the processor 120 of FIG. 1), a communication processor 920 (e.g., the first communication processor 212 of FIG. 2 and/or the second communication processor 244 of FIG. 2), and/or a communication circuit 930 (e.g., the wireless communication module 192 of FIG. 1).

The application processor 910 may control various elements of the electronic device 101. A detailed operation thereof will be described below.

The communication processor 920 may perform data transmission and/or data reception via first cellular communication and/or second cellular communication. The communication processor 920 may be connected to a first node (e.g., the first node 450 of FIG. 5A) via the first cellular communication, or may be connected to a second node (e.g., the second node 410 of FIG. 5A) via the second cellular communication. The communication processor 920 may transmit, via the first cellular communication and/or the second cellular communication, user data having been received from the application processor 910, and may transmit, to the application processor 910, user data having been received via the first cellular communication and/or the second cellular communication.

The first cellular communication corresponds to one of various cellular communication schemes which can be supported by the electronic device 101, and may mean, for example, a communication scheme on the second network 294 of FIG. 2. For example, the first cellular communication may be a communication scheme using a 5G mobile communication scheme (e.g., a new radio). In another example, the first cellular communication may correspond to a communication scheme supporting a standalone mode, among the 5G mobile communication schemes.

The second cellular communication corresponds to one of various cellular communication schemes which can be supported by an electronic device (e.g., the electronic device 101 of FIG. 1), and may mean, for example, a communication scheme on the first network 292 of FIG. 2. For example, the second cellular communication may be a communication scheme using the 4G mobile communication scheme (e.g., long-term evolution).

The communication circuit 930 corresponds to a communication circuit supporting the first cellular communication and/or the second cellular communication, and may provide, to the electronic device 101, communication with an external electronic device (e.g., the external electronic device 104 of FIG. 1) via the first cellular communication and/or the second cellular communication.

According to various embodiments of the disclosure, the electronic device 101 may change an operation mode of the electronic device 101 to reduce heating and/or power consumption while being connected to a network (e.g., the second network 294 of FIG. 2) via the first cellular communication and/or the second cellular communication.

The operation mode of the electronic device 101 corresponds to an operation mode related to the number of antennas (e.g., the second antenna module 244 of FIG. 2) used for data reception via the first cellular communication, and may include a first mode and a second mode. According to an embodiment of the disclosure, the first mode may correspond to a mode in which data reception is performed using more antennas 244 than antennas 244 used for data reception in the second mode. For example, the first mode may correspond to a mode in which data reception is performed using four antennas 244, and the second mode may correspond to a mode in which data reception is performed using two antennas 244. The more antennas used for data reception, the more power consumption of the electronic device 101 may increase (or heating may increase). Accordingly, in the electronic device 101, power consumed in the first mode may be greater than power consumed in the second mode. Hereinafter, a detailed description of an embodiment will be made, wherein when a designated condition is satisfied in a state where the electronic device 101 operates in the first mode, the mode is switched to the second mode, so that power consumption can be reduced.

The application processor 910 may acquire information related to a data throughput received from the network 294 by the electronic device 101 while the application processor is connected to the network 294 via the first cellular communication and/or the second cellular communication. According to an embodiment of the disclosure, the application processor 910 may acquire information related to the data throughput in a scheme of receiving information related to data throughput from the communication processor 920. According to another embodiment of the disclosure, the application processor 910 may also directly measure the data throughput.

The application processor 910 may identify whether the data throughput satisfies a designated condition.

The data throughput may be defined as the amount of traffic of data transmitted and/or received per unit time. The application processor 910 may monitor (or track) the amount of traffic generated by an application (or a background application) that is being executed. The application processor 910 may monitor (or track) the amount of traffic of data transmitted or received via the first cellular communication and/or the second cellular communication, and identify whether the throughput satisfies a designated condition. Alternatively, the communication processor 920 may monitor (or track) the amount of traffic of data transmitted or received via the first cellular communication and/or the second cellular communication, and transmit information related to the throughput to the application processor 910. The application processor 910 may identify whether the data throughput indicated by the information related to the throughput satisfies a designated condition.

The designated condition may include a condition in which the throughput has a value equal to or less than (or a value smaller than) a designated value (e.g., 10 Mbps).

According to another embodiment of the disclosure, the designated condition may include a condition in which a state where the throughput has a value equal to or less than a designated value is maintained for a designated time or longer. The electronic device 101 may additionally consider the condition in which the state is maintained for the designated time or longer, so as to prevent frequent switching between the first mode and/or the second mode.

The application processor 910 may identify that the throughput has failed to satisfy the designated condition, and control the communication processor 920 for operation in the first mode without switching to the second mode. The application processor 910 may not transmit, to the communication processor 920, a signal requesting switching from the first mode to the second mode. The communication processor 920 may receive data from the network 294 by using antennas 244, the number of which corresponds to the first mode, through the communication circuit 930. In response to the identification that the throughput has failed to satisfy the designated condition, the application processor 910 may maintain the first mode, continuously identify the throughput, and identify whether the designated condition is satisfied.

The application processor 910 may identify that the throughput satisfies the designated condition, and may control the communication processor 920 for switching from the first mode to the second mode. The application processor 910 may transmit, to the communication processor 920, a signal requesting switching from the first mode to the second mode.

The communication processor 920 may receive, from the application processor 910, a signal requesting the switching from the first mode to the second mode. The communication processor 920 may perform an operation of measuring a quality (e.g., a reference signal received power (RSRP), a signal to interference & noise ratio (SINR), and/or a received signal strength indicator (RSSI)) of the first cellular communication in response to the reception of the signal requesting the switching from the first mode to the second mode. The communication processor 920 may measure the quality of the first cellular communication in a scheme of measuring the quality of a signal broadcasted (or transmitted) by a base station (e.g., the base station 510 of FIG. 5A) via the first cellular communication.

The communication processor 920 may identify whether the measured quality of the first cellular communication satisfies a designated condition. The designated condition may include a condition in which the measured quality of the first cellular communication has a value equal to or greater than (or a value greater than) a designated value.

The designated value may be a value for when the electronic device 101 is switched from the first mode to the second mode, preventing deterioration in the quality of diversity reception using multiple antennas, an increase of a data reception error, and an increase of power consumption due to an increase of the number of retransmissions of the data having an error.

In response to the identification that the measured quality of the first cellular communication has failed to satisfy the designated condition, the communication processor 920 may ignore the signal requesting the switching from the first mode to the second mode, or may maintain the first mode.

In response to the identification that the measured quality of the first cellular communication has satisfied the designated condition, the communication processor 920 may perform a series of operations for switching from the first mode to the second mode.

As a part of performing a series of operations for switching from the first mode to the second mode, the communication processor 920 may change UE capability information including information related to the number of antennas used for data reception, and transmit the changed UE capability information to the network 294. The communication processor 920 may transmit, to the network 294, a tracking area update (TAU) request message including information indicating a request for updating of the UE capability information, to transmit the changed UE capability information, and may derive the network 294 so that the network 294 transmits a UE capability inquiry message. The communication processor 920 may transmit, to the network 294, a UE capability information message including the changed UE capability, based on the reception of the UE capability inquiry message transmitted by the network 294. The network 294 may change a rank related to data transmission of the electronic device 101, based on the changed UE capability information, and transmit a message (e.g., a rank indicator) indicating the changed rank, and the communication processor 920 may operate in the second mode according to the reception of the message indicating the changed rank. While operating in the second mode, the communication processor 920 may receive data from the network 294 through antennas, the number of which corresponds to the second mode.

The embodiment above describes an embodiment in which the electronic device 101 performs switching from the first mode to the second mode, based on the data throughput, but the electronic device 101 may perform switching from the first mode to the second mode based on various conditions including the data throughput.

The application processor 910 may transmit, to the communication processor 920, a signal requesting switching from the first mode to the second mode, based on the identification that the data throughput satisfies a designated condition and a pre-designated application is being executed.

The pre-designated application may correspond to an application in which a throughput of data received from the network 294 to perform a service provided by the application has a value equal to or less than a designated value. For example, the application processor 910 may pre-designate a specific application (e.g., an Internet browser) in which the throughput of data received from the network 294 has a value (e.g., 8 Mbps) less than a designated value (e.g., 10 Mbps).

The application processor 910 may not transmit, to the communication processor 920, the signal requesting the switching from the first mode to the second mode, based on the identification that the pre-designated application is not being executed even though the data throughput satisfies the designated condition.

According to another embodiment of the disclosure, the application processor 910 may not transmit, to the communication processor 920, the signal requesting the switching from the first mode to the second mode, based on the identification that an application providing a specific service is being executed, regardless of the data throughput.

The specific service may include a service (e.g., an ultra-reliable and low latency communication (URLLC)) requiring relatively low latency and/or a service (e.g., mobile edge computing (MEC) and an enhanced mobile broadband (EMBB)) requiring a higher reception and/or transmission rate. When the application providing a specific service is being executed on the electronic device 101, the switching to the second mode may cause deterioration in the quality of the specific service. Accordingly, the application processor 910 may not transmit, to the communication processor 920, the signal requesting the switching from the first mode to the second mode, based on the identification that the application providing the specific service is being executed, regardless of the data throughput, and may maintain the first mode.

With respect to the above-described embodiment of the disclosure, in a situation in which the throughput related to data reception is relatively low, the electronic device 101 may switch from the first mode to the second mode, so as to reduce the number of antennas used for data reception. In the situation in which the data throughput is relatively low, the electronic device 101 may acquire a throughput similar to the data throughput before reducing the number of antennas while reducing the power consumption in a manner of adjusting a modulation and coding scheme. Table 1 below shows that the data throughput and consumption current measured while the electronic device 101 operates in the first mode and the data throughput and consumption current measured while the electronic device 101 operates in the second mode.

TABLE 1

|  | Second mode | First mode |
| --- | --- | --- |
| Rank | N78 100 MB BW 2X2 | N78 100 MB BW 4X4 |
| Resource Block | RB273 | RB273 |
| Modulation | 64 QAM MCS11 | 64 QAM MCS5 |
| Throughput | 287 mbps | 292 mbps |
| Vbatt (mA) | 490.2 | 546.1 |

Referring to Table 1, when the electronic device 101 receives data by using a modulation and coding scheme (MCS) level (e.g., 64 quadrature amplitude modulation (QAM), MCS level 5) corresponding to the first mode, the measured data throughput is 292 Mbps and the consumption current is 546.1 mA. When the electronic device 101 receives data by using an MCS level (e.g., 64QAM, MCS level 11) corresponding to the second mode, the measured throughput is 287 Mbps and the consumption current is 490.2 mA. While the data throughput having a relatively smaller value is measured, the electronic device 101 may control the communication processor 920 to perform switching from the first mode to the second mode, and adjust the MCS level, so as to reduce the consumption current (or power consumption) while having a similar data reception rate.

While performing switching back from the second mode to the first mode, the application processor 910 and/or the communication processor 920 may perform the first cellular communication having a relatively higher throughput.

According to an embodiment of the disclosure, the application processor 910 transmit, to the communication processor 920, a signal requesting switching from the second mode to the first mode, based on identification that the throughput has a value equal to or less than a designated value (e.g., 12 Mbps) and/or identification that execution of a designated application (e.g., an Internet browser) ends. In order to prevent frequency switching between the first mode and the second mode, a designated value (e.g., 10 Mbps) considered in the switching from the first mode to the second mode and a designated value (e.g., 12 Mbps) considered in the switching from the second mode to the first mode may be configured to be different from each other.

The communication processor 920 may receive, from the application processor 910, the signal requesting the switching from the second mode to the first mode. The communication processor 920 may perform a series of operations for switching from the second mode to the first mode, based on the signal requesting the switching from the second mode to the first mode.

Alternatively, the communication processor 920 may perform a series of operations for switching from the second mode to the first mode, based on the identification that the quality of the first cellular communication has a value equal to or less than (or a value less than) a designated value. In order to prevent frequency switching between the first mode and the second mode, a designated value considered in the switching from the first mode to the second mode and a designated value considered in the switching from the second mode to the first mode may be configured to be different from each other.

As a part of performing a series of operations for the switching from the second mode to the first mode, the communication processor 920 may change UE capability information including information related to the number of antennas used for data reception, and transmit the changed UE capability information to the network 294. To transmit the changed UE capability information, the communication processor 920 may transmit, to the network 294, a tracking area update (TAU) request message including information indicating a request for updating of the UE capability information, and derive the network 294 so that the network 294 transmits a UE capability inquiry message. The communication processor 920 may transmit, to the network 294, a UE capability information message including the changed UE capability, based on the reception of the UE capability inquiry message transmitted by the network 294. The network 294 may change a rank related to data transmission of the electronic device 101, based on the changed UE capability information, and transmit a message (e.g., a rank indicator) indicating the changed rank, and the communication processor 920 may operate in the first mode according to the reception of the message indicating the changed rank. While operating in the first mode, the communication processor 920 may receive data from the network 294 through antennas, the number of which corresponds to the first mode.

The embodiment described in FIG. 9 corresponds to an embodiment which can be combined with the embodiment (e.g., switching from the first cellular communication to the second cellular communication) described in FIGS. 5A, 5B, and 6 to 8. According to an embodiment of the disclosure, after the switching from the first mode to the second mode of the first cellular communication, the electronic device 101 may release the first cellular communication and perform a connection of the second cellular communication, based on a designated condition (e.g., switching to a mode which reduces power consumption) being satisfied. In the process of switching from the first cellular communication to the second cellular communication, the embodiment described in FIGS. 5A, 5B, and 6 to 8 may be implemented. In addition to the example above, the embodiment described in FIG. 9 the embodiment may be combined with the embodiment condition (e.g., switching to a mode which reduces power consumption) described in FIGS. 5A, 5B, and 6 to 8 according to various examples.

Figure 10:
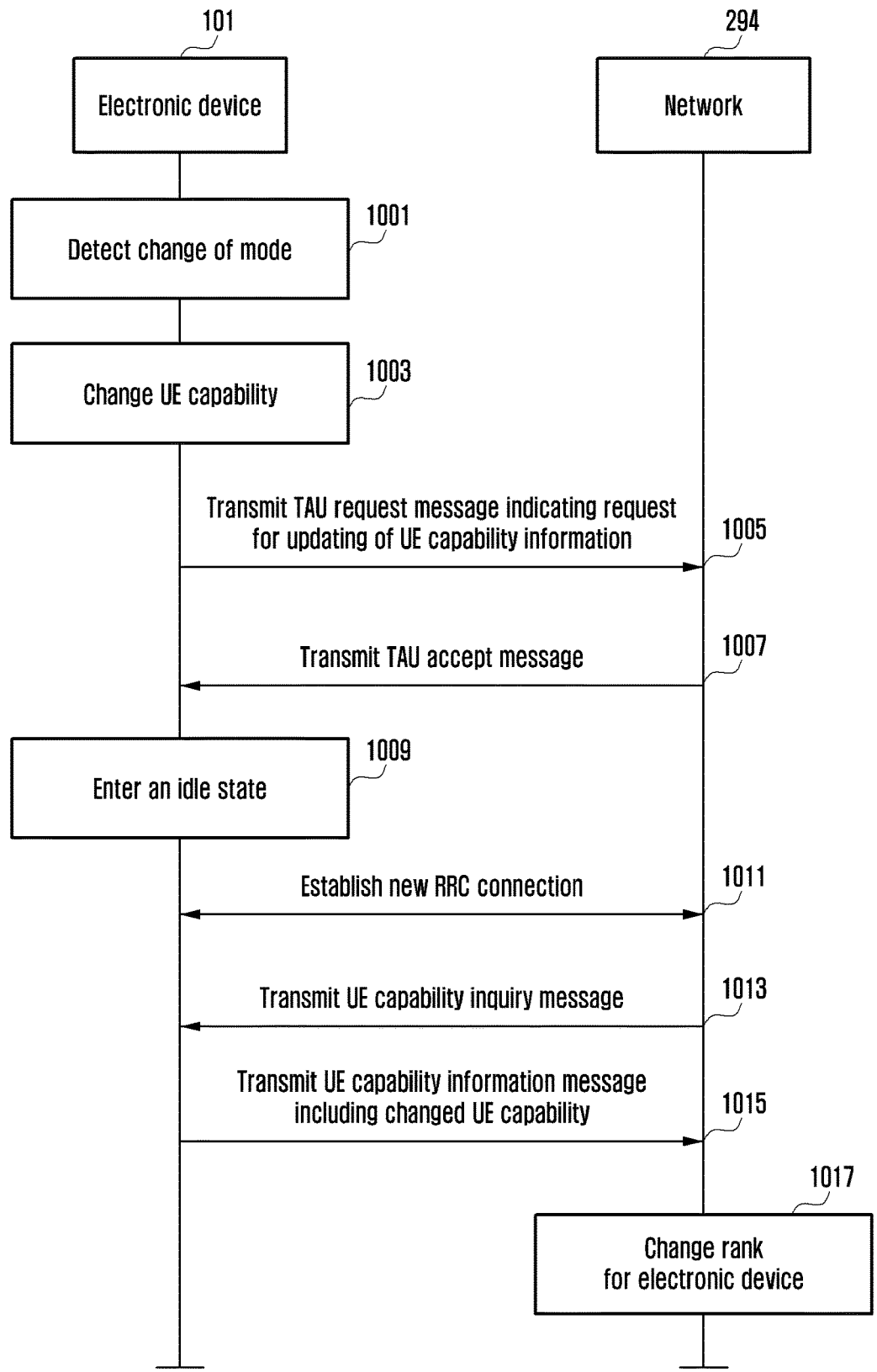
FIG. 10 is a flowchart related to an embodiment in which an electronic device transmits user equipment (UE) capability information to a network to perform switching from a first mode to a second mode according to an embodiment of the disclosure.

FIG. 10 is a flowchart related to an embodiment of switching from a first mode to a second mode (or from a second mode to a first mode) through transmission of UE capability information to a network by an electronic device according to an embodiment of the disclosure.

In operation 1001, an electronic device (e.g., the electronic device 101 of FIG. 9) may detect a change in a mode of the electronic device 101.

The operation mode of the electronic device 101 corresponds to an operation mode related to the number of antennas (e.g., the second antenna module 244 of FIG. 2) used for data reception via first cellular communication, and may include a first mode and a second mode. According to an embodiment, the first mode may correspond to a mode in which data reception is performed using more antennas 244 than antennas 244 used for data reception in the second mode. For example, the first mode may correspond to a mode in which data reception is performed using four antennas 244, and the second mode may correspond to a mode in which data reception is performed using two antennas 244. The more antennas used for data reception, the more power consumption of the electronic device 101 may increase (or heating may increase). Accordingly, in the electronic device 101, power consumed in the first mode may be greater than power consumed in the second mode.

The electronic device 101 may identify the quality of first cellular communication, based on a data throughput satisfying a designated condition and/or a pre-designated application being executed, and may determine switching from the first mode to the second mode, based on a result of the identification. Alternatively, the electronic device 101 may determine switching from the second mode to the first mode, based on the data throughput satisfying a designated condition and/or ending of execution of the pre-designated application, or based on the quality of the first cellular communication.

In operation 1003, the electronic device 101 may change UE capability, based on a change in the mode of the electronic device 101.

The UE capability corresponds to information related to the state and/or the performance of the electronic device 101, and may mean information considered in configuring and controlling a connection between the network 294 and the electronic device 101 by the network 294.

The electronic device 101 may change UE capability information including information related to the number of antennas used for data reception. For example, when the electronic device 101 is switched from the first mode to the second mode, UE capability information including information related to the number of antennas corresponding to the first mode may be amended to include information related to the number of antennas corresponding to the second mode. In another example, when the electronic device 101 is switched from the second mode to the first mode, UE capability information including information related to the number of antennas corresponding to the second mode may be amended to include information related to the number of antennas corresponding to the first mode.

In operation 1005, the electronic device 101 may transmit, to a network (e.g., the network 294 of FIG. 2), a tracking area update (TAU) request message including a request for updating of the UE capability information.

The TAU request message may mean a message for monitoring a tracking area (TA) in which the electronic device 101 exists, to smoothly performing reception of a paging message of the electronic device 101. For example, the electronic device 101 may transmit, to the network 294, a TAU request message including an information element of "UE radio capability information update needed" having a "URC upd" field that is "1".

In operation 1007, the network 294 may transmit a TAU accept message to the electronic device 101.

In operation 1009, the electronic device 101 may enter an idle state in response to reception of the TAQ accept message.

The entering into the idle state by the electronic device 101 may be expressed as, for example, performing of local releasing of an RRC connection, or may be expressed as declaring a radio link failure (RLF), but the disclosure is not limited thereto.

In operation 1011, the electronic device 101 and the network 294 may establish a new RRC connection.

For example, the electronic device 101 may not perform RRC re-establishment, based on the local releasing of the RRC connection or the RLF declaration, and may perform at least one operation for establishment of a new RRC connection. For example, the electronic device 101 may transmit, to the network 294, an RRC connection request message (for example, an RRC connection request message of an evolved universal terrestrial radio access (E-UTRA) or an RRC setup request message of NR), based on reception of the TAU accept message. The electronic device 101 may receive, from the network 294, an RRC connection setup message (for example, an RRC connection setup message of E-UTRA or an RRC setup message of NR) corresponding to an RRC connection request message. The electronic device 101 may transmit, to the network 294, an RRC connection setup complete message (for example, an RRC connection setup complete message of E-UTRA or an RRC setup complete message of NR) corresponding to the RRC connection setup message. According to the procedure above, instead of re-establishment of the existing RRC connection, a new RRC connection may be established between the electronic device 101 and the network 300.

In operation 1013, the network 294 may transmit the UE capability inquiry message to the electronic device 101.

In operation 1015, the electronic device 101 may transmit a UE capability information message including the changed UE capability to the network 294.

As described above, the UE capability information message may include information indicating a changed Rx mode. The network 294 may store and/or manage the changed UE capability.

In operation 1017, the network 294 may change a rank for the electronic device 101, based on the changed UE capability.

The network 294 may change the rank and transmit a message (e.g., a rank indicator) indicating the change rank to the electronic device 101. The changed rank may be a value corresponding to the number of times of changing an antenna used by the electronic device 101 for data reception. For example, when the electronic device 101 receives data by using four antennas in the first mode, a rank configured by the network 294 may be four. When the electronic device 101 receives data by using two antennas upon the switching from the first mode to the second mode, the network 294 may change a rank to two, based on the changed UE capability.

Figure 11:
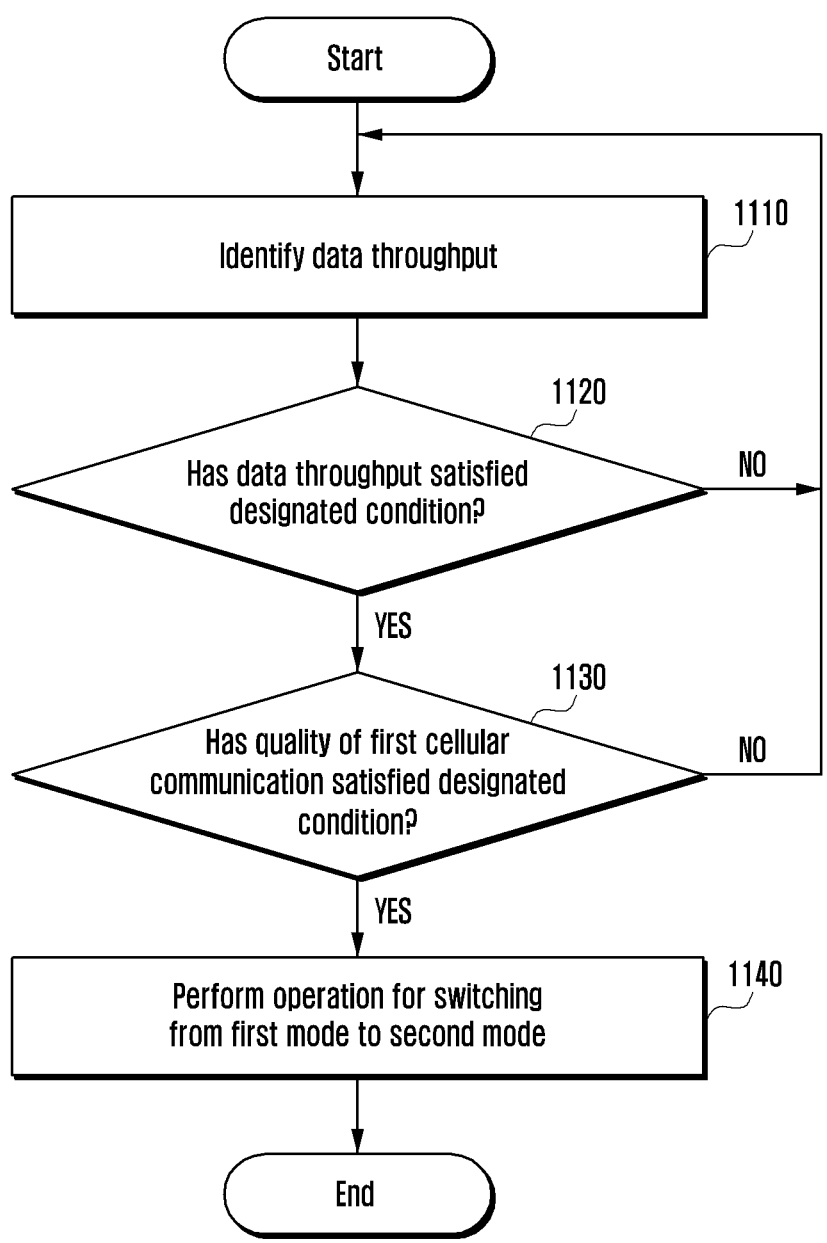
FIG. 11 is a flowchart illustrating a method of operating an electronic device according to an embodiment of the disclosure.

FIG. 11 is a flowchart illustrating a method of operating an electronic device according to an embodiment of the disclosure.

Referring to FIG. 11, in operation 1110, an electronic device (e.g., the electronic device 101 of FIG. 9) may identify a data throughput.

According to various embodiments of the disclosure, the electronic device 101 may change an operation mode of the electronic device 101 to reduce heating and/or power consumption while being connected to a network (e.g., the second network 294 of FIG. 2) via first cellular communication and/or second cellular communication.

The operation mode of the electronic device 101 corresponds to an operation mode related to the number of antennas (e.g., the second antenna module 244 of FIG. 2) used for data reception via first cellular communication, and may include a first mode and a second mode. According to an embodiment of the disclosure, the first mode may correspond to a mode in which data reception is performed using more antennas 244 than antennas 244 used for data reception in the second mode. For example, the first mode may correspond to a mode in which data reception is performed using four antennas 244, and the second mode may correspond to a mode in which data reception is performed using two antennas 244. The more antennas used for data reception, the more power consumption of the electronic device 101 may increase (or heating may increase). Accordingly, in the electronic device 101, power consumed in the first mode may be greater than power consumed in the second mode.

In a state of operating in a first mode, the electronic device 101 may identify a data throughput to determine whether to perform switching to a second mode.

The electronic device 101 may acquire information related to a data throughput received from the network 294 by the electronic device 101 while being connected to the network 294 via the first cellular communication and/or the second cellular communication. According to an embodiment of the disclosure, the electronic device 101 may acquire information data throughput in a scheme of receiving information related to data throughput from the communication processor 920. The information related to the data throughput may correspond to information indicating the data throughput.

In operation 1120, the electronic device 101 may identify whether the data throughput satisfies a designated condition.

The electronic device 101 may identify whether the data throughput satisfies a designated condition.

The data throughput may be defined as the amount of traffic of data transmitted and/or received per unit time. The electronic device 101 may monitor (or track) the amount of traffic generated by an application (or a background application) that is being executed. The electronic device 101 may monitor (or track) the amount of traffic of data transmitted or received via the first cellular communication and/or the second cellular communication, and identify whether the throughput satisfies a designated condition.

The designated condition may include a condition in which the throughput has a value equal to or less than (or a value less than) a designated value (e.g., 10 Mbps).

According to another embodiment of the disclosure, the designated condition may include a condition in which a state where the throughput has a value equal to or less than a designated value is maintained for a designated time or longer. The electronic device 101 may additionally consider the condition in which the state is maintained for the designated time or longer, so as to prevent frequent switching between the first mode and/or the second mode.

The electronic device 101 may identify that the throughput has failed to satisfy the designated condition, and control the communication processor 920 for operation in the first mode without switching to the second mode. The electronic device 101 may not transmit, to the communication processor 920, a signal requesting switching from the first mode to the second mode. The communication processor 920 may receive data from the network 294 by using antennas, the number of which corresponds to the first mode, through the communication circuit 930. In response to the identification that the throughput has failed to satisfy the designated condition, the electronic device 101 may maintain the first mode, continuously identify the throughput, and identify whether the designated condition is satisfied.

The application processor 910 may identify that the throughput satisfies the designated condition, and may control the communication processor 920 for switching from the first mode to the second mode. The application processor 910 may transmit, to the communication processor 920, a signal requesting switching from the first mode to the second mode.

In operation 1130, the electronic device 101 may identify whether the quality of the first cellular communication satisfies a designated condition, based on the data throughput satisfying the designed condition in operation 1120-Y.

The communication processor 920 may receive, from the application processor 910, a signal requesting the switching from the first mode to the second mode. The communication processor 920 may perform an operation of measuring a quality (e.g., a reference signal received power (RSRP), a signal to interference & noise ratio (SINR), and/or a received signal strength indicator (RSSI)) of the first cellular communication, based on the reception of the signal requesting the switching from the first mode to the second mode. The communication processor 920 may measure the quality of the first cellular communication in a scheme of measuring the quality of a signal broadcasted (or transmitted) by a base station (e.g., the base station 510 of FIG. 5A) via the first cellular communication.

The communication processor 920 may identify whether the measured quality of the first cellular communication satisfies a designated condition. The designated condition may include a condition in which the measured quality of the first cellular communication has a value equal to or greater than (or a value greater than) a designated value.

The designated value may be a value for when the electronic device 101 is switched from the first mode to the second mode, preventing deterioration in the quality of diversity reception using multiple antennas, an increase of a data reception error, and an increase of power consumption due to an increase of the number of retransmissions of the data having an error.

Based on the identification that the measured quality of the first cellular communication has failed to satisfy the designated condition in operation 1130-N, the electronic device 101 may ignore the signal requesting the switching from the first mode to the second mode, or may maintain the first mode and identify the data throughput.

In operation 1140, the electronic device 101 may perform an operation for switching from the first mode to the second mode, based on the measured quality of the first cellular communication, which satisfies the designated condition.

As a part of performing a series of operations for switching from the first mode to the second mode, the electronic device 101 may change UE capability information including information related to the number of antennas used for data reception, and transmit the changed UE capability information to the network 294. The electronic device 101 may transmit, to the network 294, a tracking area update (TAU) request message including information indicating a request for updating of the UE capability information, to transmit the changed UE capability information, and may derive the network 294 so that the network 294 transmits a UE capability inquiry message. The electronic device 101 may transmit, to the network 294, a UE capability information message including the changed UE capability, based on the reception of the UE capability inquiry message transmitted by the network 294. The network 294 may change a rank related to data transmission of the electronic device 101, based on the changed UE capability information, and transmit a message (e.g., a rank indicator) indicating the changed rank, and the communication processor 920 may operate in the second mode according to the reception of the message indicating the changed rank. While operating in the second mode, the electronic device 101 may receive data from the network 294 through antennas, the number of which corresponds to the second mode.

The embodiment above describes an embodiment in which the electronic device 101 performs switching from the first mode to the second mode, based on the data throughput, but the electronic device 101 may perform switching from the first mode to the second mode based on various conditions including the data throughput.

The electronic device 101 may perform switching from the first mode to the second mode, based on the identification that the data throughput satisfies a designated condition and a pre-designated application is being executed.

The pre-designated application may correspond to an application in which a throughput of data received from the network 294 to perform a service provided by the application has a value equal to or less than a designated value. For example, the electronic device 101 may pre-designate a specific application (e.g., an Internet browser) in which the throughput of data received from the network has a value (e.g., 8 Mbps) less than a designated value (e.g., 10 Mbps).

The electronic device 101 may not perform switching from the first mode to the second mode, based on the identification that the pre-designated application is not being executed even though the data throughput satisfies the designated condition.

According to another embodiment of the disclosure, the electronic device 101 may not perform switching from the first mode to the second mode, based on the identification that an application providing a specific service is being executed, regardless of the data throughput.

The specific service may include a service (e.g., an ultra-reliable and low latency communication (URLLC)) requiring relatively low latency and/or a service (e.g., mobile edge computing (MEC) and an enhanced mobile broadband (EMBB)) requiring a higher reception and/or transmission rate. When the application providing a specific service is being executed on the electronic device 101, the switching to the second mode may cause deterioration in the quality of the specific service. Accordingly, the electronic device 101 may not perform switching from the first node to the second mode, based on the identification that the application providing the specific service is being executed, regardless of the data throughput, and may maintain the first mode.

Figure 12:
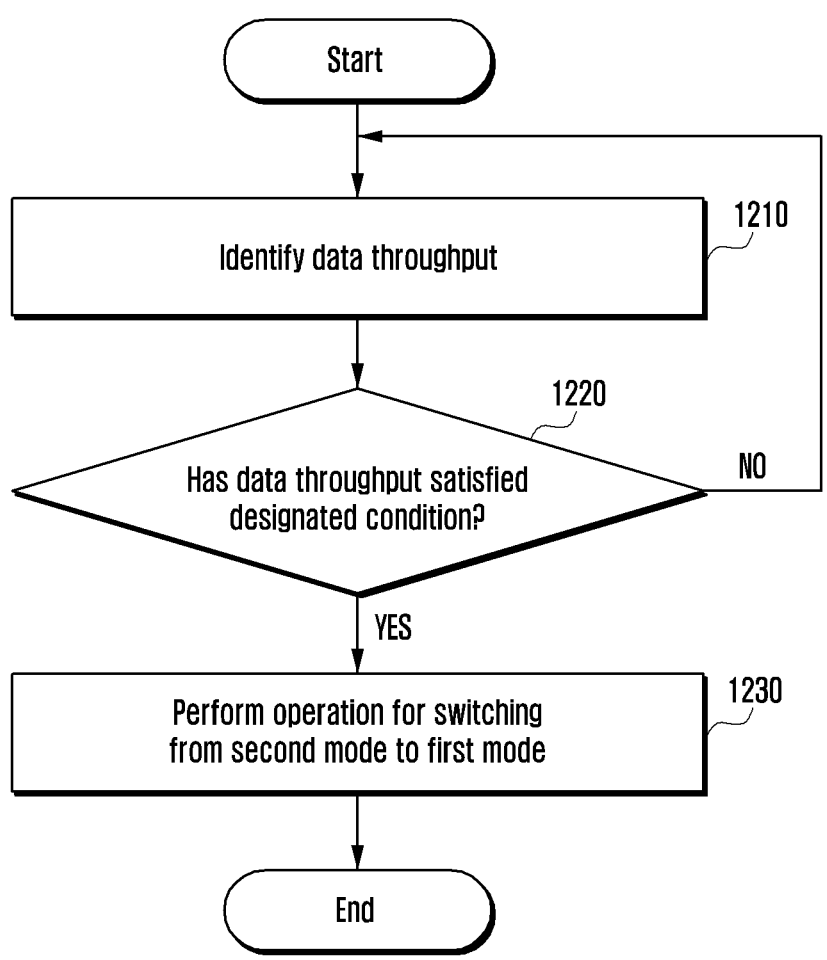
FIG. 12 is a flowchart illustrating a method of operating an electronic device according to an embodiment of the disclosure.

FIG. 12 is a flowchart illustrating a method of operating an electronic device according to an embodiment of the disclosure.

Referring to FIG. 12, in operation 1210, an electronic device (e.g., the electronic device 101 of FIG. 9) may identify a data throughput.

According to various embodiments of the disclosure, the electronic device 101 may change an operation mode of the electronic device 101 to enhance a communication performance of the electronic device 101 while being connected to a network (e.g., the second network 294 of FIG. 2) via first cellular communication and/or second cellular communication.

The operation mode of the electronic device 101 corresponds to an operation mode related to the number of antennas (e.g., the second antenna module 244 of FIG. 2) used for data reception via first cellular communication, and may include a first mode and a second mode. According to an embodiment of the disclosure, the first mode may correspond to a mode in which data reception is performed using more antennas 244 than antennas 244 used for data reception in the second mode. For example, the first mode may correspond to a mode in which data reception is performed using four antennas 244, and the second mode may correspond to a mode in which data reception is performed using two antennas 244. The more antennas used for data reception, the more power consumption of the electronic device 101 may increase (or heating may increase). Accordingly, in the electronic device 101, power consumed in the first mode may be greater than power consumed in the second mode.

In a state of operating in a second mode, the electronic device 101 may identify a data throughput to determine whether to perform switching to the first mode.

The electronic device 101 may acquire information related to a data throughput received from the network 294 by the electronic device 101 while being connected to the network 294 via the first cellular communication and/or the second cellular communication. According to an embodiment of the disclosure, the electronic device 101 may acquire information data throughput in a scheme of receiving information related to data throughput from the communication processor 920.

In operation 1220, the electronic device 101 may identify whether the data throughput satisfies a designated condition.

The electronic device 101 may identify whether the data throughput satisfies a designated condition.

The data throughput may be defined as the amount of traffic of data transmitted and/or received per unit time. The electronic device 101 may monitor (or track) the amount of traffic generated by an application (or a background application) that is being executed. The electronic device 101 may monitor (or track) the amount of traffic of data transmitted or received via the first cellular communication and/or the second cellular communication, and identify whether the throughput satisfies a designated condition. Alternatively, the communication processor 920 may monitor (or track) the amount of traffic of data transmitted or received via the first cellular communication and/or the second cellular communication, and transmit information related to the throughput to the application processor 910. The electronic device 101 may identify whether the data throughput indicated by the information related to the throughput satisfies a designated condition. The designated condition may include a condition in which the data throughput has a value equal to or less than (or a value smaller than) a designated value.

The electronic device 101 may determine whether to perform the switching from the second mode to the first mode, based on whether a condition other than the condition related to the data throughput is satisfied.

According to an embodiment of the disclosure, the electronic device 101 may transmit, to the communication processor 920, a signal requesting switching from the second mode to the first mode, based on identification that the data throughput has a value equal to or less than a designated value (e.g., 12 Mbps) and/or identification that execution of a designated application (e.g., an Internet browser) ends. In order to prevent frequency switching between the first mode and the second mode, a designated value (e.g., 10 Mbps) considered in the switching from the first mode to the second mode and a designated value (e.g., 12 Mbps) considered in the switching from the second mode to the first mode may be configured to be different from each other.

The electronic device 101 may maintain the second mode, based on the data throughput having failed to satisfy the designated condition in operation 1220-N.

In operation 1230, the electronic device 101 may perform an operation for switching from the second mode to the first mode, based on the data throughput satisfying the designated condition in operation 1220-Y.

As a part of performing a series of operations for switching from the second mode to the first mode, the electronic device 101 may change UE capability information including information related to the number of antennas used for data reception, and transmit the changed UE capability information to the network 294. The electronic device 101 may transmit, to the network 294, a tracking area update (TAU) request message including information indicating a request for updating of the UE capability information, to transmit the changed UE capability information, and may derive the network 294 so that the network 294 transmits a UE capability inquiry message. The electronic device 101 may transmit, to the network 294, a UE capability information message including the changed UE capability, based on the reception of the UE capability inquiry message transmitted by the network 294. The network 294 may change a rank related to data transmission of the electronic device 101, based on the changed UE capability information, and transmit a message (e.g., a rank indicator) indicating the changed rank, and the electronic device 101 may operate in the first mode according to the reception of the message indicating the changed rank. While operating in the first mode, the electronic device 101 may receive data from the network 294 through antennas, the number of which corresponds to the first mode.

Figure 13:
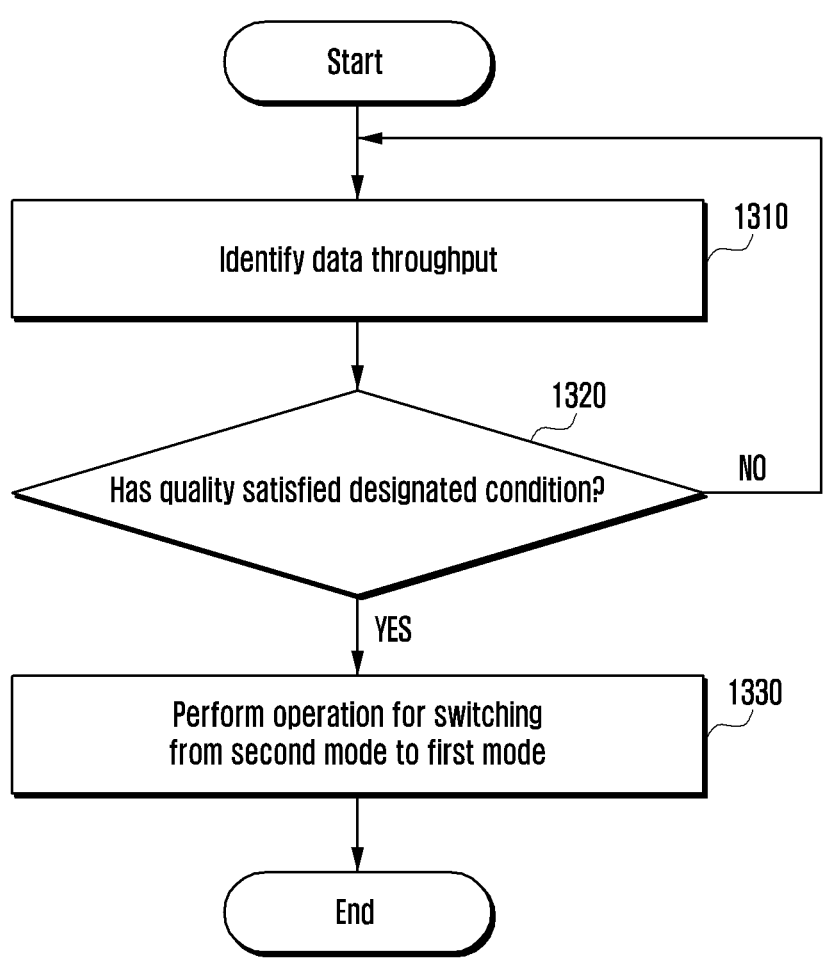
FIG. 13 is a flowchart illustrating a method of operating an electronic device according to an embodiment of the disclosure.

FIG. 13 is a flowchart illustrating a method of operating an electronic device according to an embodiment of the disclosure.

Referring to FIG. 13, in operation 1310, an electronic device (e.g., the electronic device 101 of FIG. 9) may identify the quality of first cellular communication.

According to various embodiments of the disclosure, the electronic device 101 may change an operation mode of the electronic device 101 to enhance a communication performance of the electronic device 101 while being connected to a network (e.g., the second network 294 of FIG. 2) via first cellular communication and/or second cellular communication.

The operation mode of the electronic device 101 corresponds to an operation mode related to the number of antennas (e.g., the second antenna module 244 of FIG. 2) used for data reception via first cellular communication, and may include a first mode and a second mode. According to an embodiment of the disclosure, the first mode may correspond to a mode in which data reception is performed using more antennas 244 than antennas 244 used for data reception in the second mode. For example, the first mode may correspond to a mode in which data reception is performed using four antennas 244, and the second mode may correspond to a mode in which data reception is performed using two antennas 244. The more antennas used for data reception, the more power consumption of the electronic device 101 may increase (or heating may increase). Accordingly, in the electronic device 101, power consumed in the first mode may be greater than power consumed in the second mode.

In a state of operating in a second mode, the electronic device 101 may identify the quality of the first cellular communication to determine whether to perform switching to the first mode.

The electronic device 101 may perform an operation of measuring the quality (e.g., a reference signal received power (RSRP), a signal to interference & noise ratio (SINR), and/or a received signal strength indicator (RSSI)) of the first cellular communication. The electronic device 101 may measure the quality of the first cellular communication in a scheme of measuring the quality of a signal broadcasted (or transmitted) by a base station (e.g., the base station 510 of FIG. 5A) via the first cellular communication.

In operation 1320, the electronic device 101 may identify whether the data throughput satisfies a designated condition.

The designated condition may include a condition in which the measured quality of the first cellular communication has a value equal to or greater than (or a value greater than) a designated value. The designated value may be a value for when the electronic device 101 is switched from the first mode to the second mode, preventing deterioration in the quality of diversity reception using multiple antennas, an increase of a data reception error, and an increase of power consumption due to an increase of the number of retransmissions of the data having an error.

The electronic device 101 may maintain the second mode, based on the measured quality having failed to satisfy the designated condition in operation 1320-N.

In operation 1330, the electronic device 101 may perform an operation for switching from the second mode to the first mode, based on the measured quality satisfying the designated condition in operation 1320-Y.

The electronic device 101 may perform a series of operations for switching from the second mode to the first mode, based on the identification that the quality of the first cellular communication has a value equal to or less than (or a value smaller than) a designated value. In order to prevent frequency switching between the first mode and the second mode, a designated value considered in the switching from the first mode to the second mode and a designated value considered in the switching from the second mode to the first mode may be configured to be different from each other.

As a part of performing a series of operations for switching from the second mode to the first mode, the electronic device 101 may change UE capability information including information related to the number of antennas used for data reception, and transmit the changed UE capability information to the network 294. The electronic device 101 may transmit, to the network 294, a tracking area update (TAU) request message including information indicating a request for updating of the UE capability information, to transmit the changed UE capability information, and may derive the network 294 so that the network 294 transmits a UE capability inquiry message. The electronic device 101 may transmit, to the network 294, a UE capability information message including the changed UE capability, based on the reception of the UE capability inquiry message transmitted by the network 294. The network 294 may change a rank related to data transmission of the electronic device 101, based on the changed UE capability information, and transmit a message (e.g., a rank indicator) indicating the changed rank, and the electronic device 101 may operate in the first mode according to the reception of the message indicating the changed rank. While operating in the first mode, the electronic device 101 may receive data from the network 294 through antennas, the number of which corresponds to the first mode.

An electronic device according to various embodiments of the disclosure may include a communication circuit supporting first cellular communication, an application processor, and a communication processor, wherein the application processor acquires information related a data throughput, and determines whether to transmit, to the communication processor, a signal requesting a change from a first mode to a second mode, based on whether a data throughput indicated by the information related to the data throughput satisfies a designated condition, the communication processor is configured to receive, from the application processor, the signal requesting the change from the first mode to the second mode, in response to the reception of the signal, measure a quality of the first cellular communication, and perform at least one operation for the change from the first mode to the second mode, based on the measured quality satisfying the designated condition, and each of the first mode and the second mode corresponds to a mode related to a number of antennas used for reception of data via the cellular communication.

In the electronic device according to various embodiments of the disclosure, the communication processor may be configured to maintain the first mode, based on the measured quality having failed to satisfy the designated condition.

In the electronic device according to various embodiments of the disclosure, the application processor may be configured to transmit the signal to the communication processor, based on identification that the data throughput indicated by the information related to the data throughput satisfies the designated condition and a pre-designated application is being executed.

In the electronic device according to various embodiments of the disclosure, the pre-designated application may include an application in which a data throughput for performing a service provided the application has a value equal to or less than a designated value.

In the electronic device according to various embodiments of the disclosure, the application processor may be configured not to transmit the signal to the communication processor, based on identification that an application providing a specific service is being executed, regardless of the data throughput indicated by the information related to the data throughput.

In the electronic device according to various embodiments of the disclosure, the specific service may correspond to a service in which latency required for the specific service has a value equal to or less than a designated value, or a reception rate for the specific service has a value equal to or greater than a designated value.

In the electronic device according to various embodiments of the disclosure, in the at least one operation for the change from the first mode to the second mode, when operating in the second mode, the electronic device may be configured to transmit, to a network of the first cellular communication, UE capability information including information related to the number of antennas used for data reception.

In the electronic device according to various embodiments of the disclosure, the application processor may determine whether to transmit, to the communication processor, a signal requesting a change from a second mode to a first mode, based on whether the data throughput indicated by the information related to the data throughput satisfies a designated condition, and the communication processor may be configured to perform at least one operation for the change from the second mode to the first mode, based on reception of the signal requesting the change from the second mode to the first mode from the application processor.

In the electronic device according to various embodiments of the disclosure, the communication processor may be configured to perform at least one operation for the change from the second mode to the first mode, based on the measured quality satisfying the designated condition.

In the electronic device according to various embodiments of the disclosure, the first mode may correspond to a 4Rx mode in which four antennas are used for data reception via the first cellular communication, and the second mode may correspond to a 2Rx mode in which two antennas are used for data reception via the first cellular communication.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a temperature sensor configured to measure a temperature of at least a part of the electronic device;
a display;
a communication circuit supporting first cellular communication and/or second cellular communication;
memory storing one or more computer programs; and
at least one processor,
wherein the one or more computer programs include computer-executable instructions that, when executed by the at least one processor individually or collectively, cause the electronic device to:
identify a state of the display while the electronic device is connected via the first cellular communication,
in response to a deactivated state of the display, identify whether each of the temperature measured by the temperature sensor and a throughput of data transmission via the first cellular communication satisfies a respective designated condition, and
based on the identification that each of the temperature and the throughput satisfies the respective designated condition and an application performing reception of data at a time interval shorter than a designated time of a timer set by the first cellular communication is executed on the electronic device, control the communication circuit to transmit secondary cell group failure (SCGF) for releasing of the connection of the first cellular communication.

2. The electronic device of claim 1, wherein the one or more computer programs further include computer-executable instructions that, when executed by the at least one processor individually or collectively, cause the electronic device to transmit a measurement report (A2 measurement report) configured to be reported when a strength of a signal for an A2 event, transmitted by a node connected via the first cellular communication, has a value less than a specific value.

3. The electronic device of claim 1, wherein the one or more computer programs further include computer-executable instructions that, when executed by the at least one processor individually or collectively, cause the electronic device to perform one or more operations for maintaining the releasing of the connection of the first cellular communication after the releasing of the connection of the first cellular communication.

4. The electronic device of claim 3, wherein the one or more computer programs further include computer-executable instructions that, when executed by the at least one processor individually or collectively, cause the electronic device not to transmit a B1 event measurement report (B1 measurement report) configured to be reported when a strength of a signal transmitted by a node connected via the first cellular communication has a value greater than a specific value.

5. The electronic device of claim 1, wherein, in response to identification that an application being executed on the electronic device corresponds to a designated application, the one or more computer programs further include computer-executable instructions that, when executed by the at least one processor individually or collectively, cause the electronic device not to perform one or more operations for performing the releasing of the connection of the first cellular communication.

6. The electronic device of claim 5, wherein the designated application comprises an application supporting a call voice over NR (VONR) via the first cellular communication.

7. The electronic device of claim 1, wherein, in response to identification that an application being executed on the electronic device is a designated application, the one or more computer programs further include computer-executable instructions that, when executed by the at least one processor individually or collectively, cause the electronic device to identify whether the display is in a deactivated state.

8. The electronic device of claim 1, wherein the memory is configured to store a list of applications for which releasing of a radio resource control (RRC) connection of the first cellular communication is prohibited according to satisfying the designated condition.

9. The electronic device of claim 1, wherein the one or more computer programs further include computer-executable instructions that, when executed by the at least one processor individually or collectively, cause the electronic device to:
- in response to switching of a state of the display into a deactivated state, identify whether the throughput satisfies the designated condition,
- in response to the throughput satisfying the designated condition, wait for the releasing of the connection of the first cellular communication, and
- when the connection of the first cellular communication has not been released for a designated time, perform one or more operations for performing the releasing of the connection of the first cellular communication.

* * * * *